United States Patent
Tsuji

(10) Patent No.: US 6,615,585 B2
(45) Date of Patent: Sep. 9, 2003

(54) INTAKE-AIR COOLING TYPE GAS TURBINE POWER EQUIPMENT AND COMBINED POWER PLANT USING SAME

(75) Inventor: Tadashi Tsuji, Hyogo-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 10/054,871

(22) Filed: Jan. 25, 2002

(65) Prior Publication Data

US 2002/0066265 A1 Jun. 6, 2002

Related U.S. Application Data

(62) Division of application No. 09/272,320, filed on Mar. 19, 1999, now abandoned.

(30) Foreign Application Priority Data

Mar. 24, 1998 (JP) .............................. 10-075460

(51) Int. Cl.[7] .............................. F02C 1/00; F02G 3/00
(52) U.S. Cl. ...................... 60/728; 60/784; 60/39.53
(58) Field of Search .................. 60/728, 784, 772, 60/773, 39.511, 39.53

(56) References Cited

U.S. PATENT DOCUMENTS 3,788,066 A * 1/1974 Nebgen ...................... 60/39.05
3,796,045 A   3/1974 Foster-Pegg
3,877,218 A * 4/1975 Nebgen ........................ 60/775
3,902,546 A * 9/1975 Linhardt et al. ............ 165/240
4,418,527 A  12/1983 Schlom et al.
5,191,767 A   3/1993 Kane et al.
5,353,597 A  10/1994 Faulkner et al.
5,444,971 A   8/1995 Holenberger
5,537,813 A   7/1996 Davis et al.
5,555,738 A   9/1996 DeVault
5,626,019 A   5/1997 Shimizu et al.
5,655,373 A   8/1997 Yamashita et al.
5,697,207 A  12/1997 Cromer et al.
5,758,502 A   6/1998 Utamura et al.

FOREIGN PATENT DOCUMENTS

| | | |
|---|---|---|
| DE | 2 140 446 | 3/1972 |
| JP | 08 158814 | 6/1996 |
| JP | 08 232681 | 9/1996 |
| JP | 08 246812 | 9/1996 |

* cited by examiner

Primary Examiner—Charles G. Freay
Assistant Examiner—William H. Rodriguez
(74) Attorney, Agent, or Firm—Sughrue Mion, PLLC

(57) ABSTRACT

In an intake-air refrigeration system of intake-air cooling type gas turbine power equipment, heat discharged to the atmosphere heretofore is recovered for further utilization. A refrigerant vapor discharged from and evaporator (05) of the refrigeration system is compressed by a refrigerant compressor (02) to be transformed to pressurized refrigerant vapor. Heat carried by the pressurized refrigerant vapor is supplied to a heat utilization system (80) to be recovered therein.

5 Claims, 17 Drawing Sheets

INTAKE-AIR COOLING TYPE GAS TURBINE POWER EQUIPMENT AND COMBINED POWER PLANT USING SAME

This is a divisional of application Ser. No. 09/272,320 filed on Mar. 19, 1999, now abandoned the disclosure of which is incorporated by reference.

BACKGROUND OF THE INVENTION

1. Field of the Invention

The present invention relates to intake-air cooling type gas turbine power equipment. More particularly, the invention is concerned with intake-air cooling type gas turbine power equipment in which air taken in from the atmosphere is previously cooled and then the cooled air is compressed to produce compressed air, which is then subjected to combustion with a fuel introduced from an external system provided separately from the power equipment, wherein a gas turbine is rotationally driven under the action of the combustion gas of a high temperature resulting from the combustion of the compressed air with the fuel supplied from the external system, and wherein an electric generator operatively coupled to a rotor shaft of the gas turbine is driven through rotation of the rotor shaft for generating electric energy.

Furthermore, the present invention is also concerned with a combined power plant comprised of a combination of the gas turbine power equipment described above and steam turbine power generation equipment which includes a heat-recovery type steam generation boiler in which heat carried by an exhaust gas discharged from the gas turbine is recovered to be utilized for producing a high-temperature/high-pressure steam, a steam turbine driven under the action of the high-temperature/high-pressure steam produced by the heat-recovery type steam generation boiler, and an electric generator operatively coupled to a rotor shaft of the steam turbine, wherein the electric generator is driven through rotation of the rotor shaft for generating electric energy.

2. Description of Related Art

In the conventional gas turbine equipment, air is taken in from the atmosphere for combustion with a fuel within a combustor or for cooling high-temperature components of the gas turbine equipment which are heated to high-temperatures in the course of operation of the gas turbine equipment such as, for example, the main body of the combustor, a tail cylinder, moving blades and stationary blades of the first stage as well as a blade shroud of the gas turbine. The air taken in, i.e., the intake air, is compressed by an air compressor for producing compressed air which is then supplied to the combustor or fed to the aforementioned high-temperature components of the gas turbine equipment for the cooling thereof.

In recent years, with a view to increasing the output of the gas turbine equipment by combusting a greater amount of fuel while increasing the amount of intake air so that a greater amount of air can be used for cooling the high-temperature components of the equipment to thereby reduce heat load thereof for allowing the manufacturing costs of the high-temperature components to be decreased while lengthening the service life thereof, and additionally for the purpose of increasing the inlet temperature of the gas turbine, there has been developed the gas turbine equipment which adopts such an intake air cooling scheme that the air taken in from the atmosphere, i.e., the intake air of the gas turbine, is cooled prior to being supplied to the air compressor, whereon the cooled air is introduced into the gas turbine equipment to thereby increase the effective air quantity, i.e., mass flow of air. Such gas turbine equipment is now attracting public attention.

As one of the means for cooling the intake gas of the gas turbine, there is known a refrigeration system. FIG. 15 is a block diagram showing schematically an arrangement of a conventional refrigeration system. Referring to the figure, reference numeral 101 denotes an electric drive motor, 102 denotes generally a refrigerant compressor driven by the electric motor 101 for compressing a refrigerant vapor to thereby produce a compressed refrigerant vapor, 103 denotes a condenser for cooling the compressed refrigerant vapor with cooling water to condense the compressed refrigerant vapor for thereby producing a liquid-phase refrigerant or refrigerant liquid, 104 denotes a cooling tower for cooling the water which is heated upon cooling of the compressed refrigerant vapor and for feeding back the cooled water to the condenser 103, and 104' denotes an additional cooling apparatus which is installed separately from the cooling tower 104 and which is destined for cooling the water heated in the condenser 103 and feeding back the cooled water to the latter. Further, reference numeral 105 denotes an evaporator for expanding the refrigerant liquid to transform it to the gas phase, i.e., refrigerant vapor. In that case, water circulating through or between a destined cooling water utilization system (not shown) and the evaporator 105 is deprived of a quantity of heat which corresponds to the latent heat of vaporization of the refrigerant liquid upon expansion thereof. In this way, the circulating water is cooled before being supplied to the destined cooling water utilization system.

In operation, the refrigerant compressor 102 is driven by the electric motor 101 to compress the refrigerant vapor, e.g. vapor of substitute freon, ammonia or the like. The compressed refrigerant vapor is then charged to the condenser 103 where the compressed refrigerant vapor is cooled by the cooling water fed from the cooling tower 104 and/or the additional cooling apparatus 104' to be condensed to the refrigerant liquid (i.e., liquid-phase refrigerant) which is then fed to the evaporator 105. As mentioned above, water is circulating through the evaporator 105 and the cooling water utilization system (not shown). Consequently, in the evaporator 105, the circulating water is deprived of heat equivalent or corresponding to the latent heat of vaporization of the refrigerant liquid, which is thus vaporized or gasified into the refrigerant vapor. On the other hand, the circulating water deprived of heat equivalent to the latent heat of vaporization of the refrigerant liquid is cooled and fed to the cooling water utilization system or equipment. The refrigerant vapor is supplied to the refrigerant compressor 102 and compressed again to be discharged therefrom as the compressed refrigerant vapor. In this way, a refrigeration cycle is established through the processes of heat transfers to/from the refrigerant and the phase changes or transformations thereof.

In the refrigeration cycle described above, the amount of heat injected into the refrigeration system is a sum of the heat Q1 which is generated upon compression of the refrigerant vapor in the refrigerant compressor 102 which is driven by the electric motor (i.e., heat corresponding to the driving energy for the electric motor) and the heat Q2 which is equivalent to the latent heat of vaporization deprived of the water circulating through the evaporator 105 and the destined cooling water utilization system. On the other hand, heat emanating from the refrigeration system to the ambient is represented by the heat Q3 which is dissipated from the cooling tower 104 and the additional cooling apparatus 104' when water whose temperature has been raised upon cooling of the compressed refrigerant vapor in the condenser 103 for condensation thereof to the liquid phase is cooled to cold water in the cooling tower 104 and/or the additional cooling apparatus 104'. The heat injected into the refrigeration system and the heat dissipated therefrom must be in equilibrium with each other. In other words, there applies valid the relation given by Q3=Q1+Q2.

FIG. 16 is a block diagram showing a system configuration of a conventional intake-air cooling type gas turbine power equipment in which a refrigeration system is employed. Referring to FIG. 16, reference numeral 106 denotes generally a refrigeration system which includes as major components an electric motor 101, a refrigerant compressor 102, a condenser 103, a cooling tower 104 and an evaporator 105. Reference numeral 107 designates air in the atmosphere. Further, reference numeral 108 denotes a suction chamber into which the air 107 is introduced, 109 designates feed air discharged from the suction chamber, 110 denotes an intake-air cooling chamber for cooling the feed air 109 discharged from the suction chamber 108 through heat exchange with the water cooled by the evaporator 105 of the refrigeration system 106, numeral 111 designates cooled air which is cooled in the intake-air cooling chamber and exhibiting an increased mass flow, 112 denotes an air compressor for transforming the cooled air 111 into compressed air, 113 designates flow of the compressed air compressed by the air compressor (to be utilized for the fuel combustion and for cooling the high-temperature components), 114 designates a fuel supplied from a relevant system (not shown), 115 denotes a combustor for combusting the compressed air 113 and the fuel 114 to thereby produce a high-temperature combustion gas, 116 designates a flow of the high-temperature combustion gas produced by the combustor 115, numeral 117 denotes a gas turbine driven rotationally under the action of the high-temperature combustion gas 116, numeral 118 denotes an electric generator which is operatively coupled to a rotor shaft of the gas turbine and driven through rotation of the rotor shaft for thereby generating electric energy.

In the refrigeration system 106, the refrigerant vapor, e.g. gas of substitute freon, ammonia or the like, is compressed by the refrigerant compressor 102 driven by the electric drive motor 101 and then supplied to the condenser 103 where the compressed refrigerant vapor is cooled by the cold water fed from the cooling tower 104 to be condensed into a refrigerant liquid. The refrigerant liquid undergoes phase-transformation into a refrigerant vapor in the evaporator 105. Upon phase-transformation of the refrigerant liquid in the evaporator 105, heat corresponding to the latent heat of vaporization is deprived of from the water circulating through the evaporator 105 and the intake-air cooling chamber 110, whereby the circulating water is cooled to cold water. On the other hand, air 107 is introduced into the suction chamber 108 from the atmosphere as the gas turbine intake air, and thus the feed air 109 is supplied to the intake-air cooling chamber 110 from the suction chamber 108. In the intake-air cooling chamber 110, the feed air 109 is cooled by the cold water supplied from the evaporator 105, whereby the cooled air 111 is discharged from the intake-air cooling chamber 110. The water whose temperature has been raised upon cooling of the feed air 109 is fed back to the evaporator 105 to be cooled again to serve as the cooling water. The cooled air 111 is fed to the air compressor 112 to be compressed. Thus, the compressed air 113 is discharged from the air compressor 112. A major portion of the compressed air 113 is supplied to the combustor 115 to undergo combustion with the fuel 114 fed from a fuel system (not shown). On the other hand, the remaining part of the compressed air 113 is made use of for cooling the high-temperature components of the gas turbine power equipment. The high-temperature combustion gas 116 which results from the combustion of the fuel 114 with the air in the combustor 115 is fed to the gas turbine 117. Under the action of the high-temperature combustion gas 116, the moving blades mounted fixedly on a rotor (not shown) of the gas turbine 117 are caused to rotate at a high speed. Thus, the electric generator 118 operatively coupled to the rotor shaft of the turbine is rotationally driven for generation of the electric energy.

FIG. 17 is a block diagram showing schematically and generally a system configuration of a combined power plant in which the intake-air cooling type gas turbine power equipment described above by reference to FIG. 16 is combined with a heat-recovery type steam generation boiler and steam turbine power generating equipment with a view to enhancing the efficiency of power generation. In the figure, reference numeral 119 designates an exhaust gas discharged from the gas turbine 117, numeral 120 denotes a heat-recovery steam generation boiler for recovering the heat carried by the exhaust gas 119 to thereby produce a high-temperature/ high-pressure steam by burning a fuel supplied to the boiler, as occasion requires, 121 designates a flow of high-temperature/high-pressure steam 21 produced by the heat-recovery type steam generation boiler 120, numeral 122 denotes a steam turbine rotated under the action of the high-temperature/high-pressure steam 121, numeral 123 denotes an electric generator which is operatively coupled to a rotor shaft of the steam turbine and driven through rotation of the rotor shaft thereof for generating electric energy, 124 designates a flow of exhaust steam discharged from the steam turbine 22, numeral 125 denotes a condenser for condensing the exhaust steam 124 into condensed water, 126 designates a flow of condensed water which is fed back to the heat-recovery type steam generation boiler, and reference symbol P1 denotes a pump for feeding the condensed water 126 to the heat-recovery type steam generation boiler 120. Further, reference numeral 127 designates a flow of exhaust gas discharged from the heat-recovery type steam generation boiler 120, and numeral 128 denotes a smoke stack for discharging the exhaust gas 127 to the atmosphere.

In the figures referenced in the above and in the following description, thick solid lines indicate flows of intake air and exhaust gases in the gas turbine power equipment and the heat-recovery type steam generation boiler, thin solid lines indicate flows of water, refrigerant liquid and the like, and broken lines indicate flows of gases such as steam, refrigerant vapor and the like which circulate through or between the refrigeration system and the steam turbine power generation equipment.

In the intake-air cooling type gas turbine power equipment shown in FIG. 16 as well as in the combined power plant including the combination of the intake-air cooling type gas turbine power equipment, the heat-recovery type steam generation boiler and the steam turbine power generation equipment, as shown in FIG. 17, it is noted that in the refrigeration system designed for cooling the gas turbine intake air as described hereinbefore by reference to the block diagram of FIG. 15 showing the system configuration of the refrigeration system, the heat quantities (Q1+Q2) injected into the refrigerant circulating system of the refrigeration system 106 comprised of the refrigerant compressor 102, the condenser 103, the evaporator 105 and so forth, i.e., the sum of the heat Q1 generated upon compression of the refrigerant vapor by the refrigerant compressor 102 driven by the electric motor 101 and the heat Q2 recovered from the water circulating through the evaporator 105 and the intake-air cooling chamber 110, namely, the heat substantially equivalent to the heat recovered, being deprived of from the feed air 109 (i.e., the intake air of the gas turbine) upon cooling thereof, is transmitted to the water circulating through the condenser 103 and the cooling tower 104 and/or the additional cooling apparatus 104' to be ultimately dissipated from the cooling tower and/or the other cooling apparatus to the atmosphere, involving thus a heat loss.

SUMMARY OF THE INVENTION

In the light of the state of the art described above, it is an object of the present invention to provide intake-air cooling type gas turbine power equipment and a combined power plant comprised of a combination of the intake-air cooling type gas turbine power equipment with a heat-recovery type steam generation boiler and steam turbine power generation equipment in which the heat dissipated to the atmosphere in the conventional intake-air cooling type gas turbine power equipment and the conventional combined power plant is recovered for utilization as heat source for generation of steam in the electric power generation systems, heat source for reheating the intake air of the gas turbine after having been cooled as well as for utilization in a heat utilization system such as a thermal process or processes, an energy service center and/or the like while suppressing the heat loss to a possible minimum.

In view of the above and other objects which will become apparent as the description proceeds, the present invention is directed to improvement of the intake-air cooling type gas turbine power equipment and the combined power equipment including a combination of the intake-air cooling type gas turbine power equipment, a heat-recovery type steam generation boiler and steam turbine power generation equipment.

Thus, according to a general aspect of the present invention, there is provided intake-air cooling type gas turbine power equipment, which includes a refrigeration system comprised of an evaporator and a refrigerant compressor, an intake-air cooling chamber for cooling air taken in from the atmosphere by the evaporator of the refrigeration system, an air compressor for compressing the air cooled in the intake-air cooling chamber to thereby produce compressed air, a combustor for burning a fuel supplied from an external system with the compressed air produced by said air compressor to thereby produce a combustion gas, a gas turbine driven rotationally under the action of the combustion gas produced by the combustor, and an electric generator operatively coupled to a rotor shaft of the gas turbine for generating electric energy, being driven through rotation of the rotor shaft, wherein the refrigerant vapor leaving the evaporator of the refrigeration system is compressed by means of the aforementioned refrigerant compressor to be transformed to a pressurized refrigerant vapor, and wherein heat carried by the pressurized refrigerant vapor is supplied to a heat utilization system to be recovered for utilization.

In a preferred mode for carrying out the present invention, the pressurized refrigerant vapor itself that leaves the refrigerant compressor may be circulated through the heat utilization system so that the heat carried by the pressurized refrigerant vapor can be supplied to the heat utilization system for recovery.

In another preferred mode for carrying out the invention, the refrigeration system may further include a condenser, wherein the pressurized refrigerant vapor leaving the refrigerant compressor is fed to the condenser so that the pressurized refrigerant vapor can undergo heat exchange with a heat transfer medium which circulates through the condenser and the heat utilization system, whereby heat carried by the compressed refrigerant vapor is supplied to the heat utilization system through the medium of the heat transfer medium to be recovered for utilization in the heat utilization system.

In yet another preferred mode for carrying out the invention, a heater for heating and drying the air cooled by the intake-air cooling chamber may be disposed within the intake-air cooling chamber at a cooled-air discharge side thereof, and the heat carried by the pressurized refrigerant vapor leaving the refrigerant compressor may be utilized as a source of heat for the heater.

According to another aspect of the invention, there is provided a combined power plant, which includes intake-air cooling type gas turbine power equipment, a heat-recovery type steam generation boiler, steam turbine power generation equipment and a condenser. In the combined power plant, the intake-air cooling type gas turbine power equipment includes a refrigeration system comprised of an evaporator and a refrigerant compressor, an intake-air cooling chamber for cooling air taken in from the atmosphere by the evaporator of the refrigeration system, an air compressor for compressing the air cooled by the intake-air cooling chamber to thereby produce compressed air, a combustor for burning a fuel supplied from an external system with the compressed air produced by said air compressor to thereby produce a combustion gas, a gas turbine driven rotationally under the action of the combustion gas produced by the combustor, and an electric generator operatively coupled to a rotor shaft of the gas turbine for generating electric energy, being driven through rotation of the rotor shaft. The heat-recovery type steam generation boiler mentioned above serves for recovering a quantity of heat carried by the combustion exhaust gas discharged from the gas turbine of the gas turbine power equipment. On the other hand, the steam turbine power generation equipment mentioned above includes a steam turbine driven rotationally under the action of a high-temperature/high-pressure steam produced by the heat-recovery type steam generation boiler and an electric generator operatively coupled to a rotor shaft of the steam turbine for generating electric energy, being driven through rotation of the rotor shaft. The condenser mentioned above serves for condensing to water (condensed water) the steam discharged from the steam turbine of the steam turbine power generation equipment. In the combined power plant described above, the condensed water is used in the evaporator of the refrigeration system and the refrigerant vapor generated by the evaporator is pressurized by the refrigerant compressor. Heat carried by the pressurized refrigerant vapor is utilized for heating feed water of the heat-recovery type steam generation boiler utilized for recovery by the steam turbine as power.

In a preferred mode for carrying out the invention in conjunction with the combined power plant described above, the evaporator of the refrigeration system may be disposed within the intake-air cooling chamber of the intake-air cooling type gas turbine power equipment for cooling the intake air, and the refrigerant vapor leaving the evaporator may be compressed by the refrigerant compressor to thereby be transformed to a pressurized refrigerant vapor.

According to yet another aspect of the invention, there is provided a combined power plant, which includes intake-air cooling type gas turbine power equipment, a heat-recovery type steam generation boiler, steam turbine power generation equipment and a condenser. In the combined power plant, the intake-air cooling type gas turbine power equipment includes a refrigeration system comprised of an evaporator and a refrigerant compressor, an intake-air cooling chamber for cooling air taken in from the atmosphere by the evaporator of the refrigeration system, an air compressor for compressing the air cooled by the intake-air cooling chamber to thereby produce compressed air, a combustor for burning a fuel supplied from an external system with the compressed air produced by said air compressor to thereby produce a combustion gas, a gas turbine driven rotationally under the action of the combustion gas produced by the combustor, and an electric generator operatively coupled to a rotor shaft of the gas turbine for generating electric energy, being driven through rotation of the rotor shaft. The heat-recovery type steam generation boiler mentioned above serves for recovering a quantity of heat carried by the combustion exhaust gas discharged from the gas turbine of the gas turbine power equipment On the other hand, the steam turbine power generation equipment mentioned above includes a steam turbine driven rotationally under the action of a high-temperature/high-pressure steam produced by the heat-recovery type steam generation boiler and an electric generator operatively coupled to a rotor shaft of the steam turbine for generating electric energy, being driven through rotation of the rotor shaft. The condenser mentioned above serves for condensing to water (condensed water) the steam discharged from the steam turbine of the steam turbine power generation equipment. In the combined power plant described above, refrigerant vapor discharged from the evaporator of the refrigeration system is pressurized to a pressurized refrigerant vapor by the refrigerant compressor, the pressurized refrigerant vapor being fed to the condenser of the refrigeration system where the pressurized refrigerant vapor undergoes heat exchange with the condensed water produced by the condenser to thereby heat the condensed water while the pressurized refrigerant vapor itself is condensed to a refrigerant liquid (liquid-phase refrigerant) to be fed back to the evaporator, whereas the condensed water as heated is fed to the heat-recovery type steam generation boiler.

In a further preferred mode for carrying out the invention in conjunction with the combined power plant described just above, the evaporator of the refrigeration system may be disposed within the intake-air cooling chamber of the intake-air cooling type gas turbine power equipment for cooling the intake air, and the refrigerant vapor leaving the evaporator may be compressed by the refrigerant compressor to thereby be transformed to the pressurized refrigerant vapor.

As mentioned previously, in the conventional intake-air cooling type gas turbine power equipment as well as the conventional combined power plant in which the intake-air cooling type gas turbine power equipment is employed, the heat recovered by the evaporator upon cooling of the intake air and the heat generated in the course of operation of the refrigerant compressor in the refrigeration system are dissipated to the atmosphere from the cooling tower and/or other cooling apparatus, involving the heat loss. By contrast, in the intake-air cooling type gas turbine power equipment and the combined power plant employing the same according to the present invention, the heat mentioned above can be utilized as a heat source for reheating the intake air for the gas turbine intake air and/or as heat source for producing steam and for heating feed water for an external electric power generation system and/or can be recovered for utilization in an external heat utilization system such as thermal processes, energy service center or the like. Thus, occurrence of heat loss can be suppressed to a possible minimum.

At this juncture, description will be made of the refrigeration system employed according to the present invention. Assuming that water/steam is to be used as the refrigerant, heat substantially equivalent to heat of vaporization of water is deprived of from the ambient or a heat transfer medium upon expansion of water under high vacuum e.g. of 6.5 mmHg, whereby the ambient temperature is lowered or the heat transfer medium is cooled. The refrigerant water itself transforms into steam (gas) which undergoes compression work to thereby be compressed and resumes the phase of water through condensation. The liquid-phase water or condensed water is again expanded under high vacuum. In this manner, a Rankine cycle or so-called heat pump in which expansion/compression/condensation process is repeated is carried out, which provides the fundamental basis for the refrigeration.

By using the refrigeration system for cooling the intake air of the gas turbine, the intake air temperature of e.g. 30 C. can be lowered to a level within a range of 10 C. to 15 C. When the temperature of the intake air of the gas turbine is lowered, the mass flow of the intake air to be consumed in the combustion with the fuel and to be used for cooling the high-temperature components will necessarily increase. Thus, the output of the gas turbine can be increased, while cooling of the high-temperature components can be realized with enhanced efficiency.

In addition to the refrigeration system where the water/steam is used as the refrigerant, there exists refrigeration systems in which dedicated refrigerant such as substitute freon, ammonia or the like is employed. Further, for driving the refrigerant compressor of the refrigeration system, there may be adopted electric motor drive, gas or steam turbine drive, engine drive by diesel engine or gasoline engine, single-shaft type combined cycle drive or the like. The refrigeration system may be realized by a given one of various combinations of the refrigerating machines, refrigerants and the drives mentioned above.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1A:
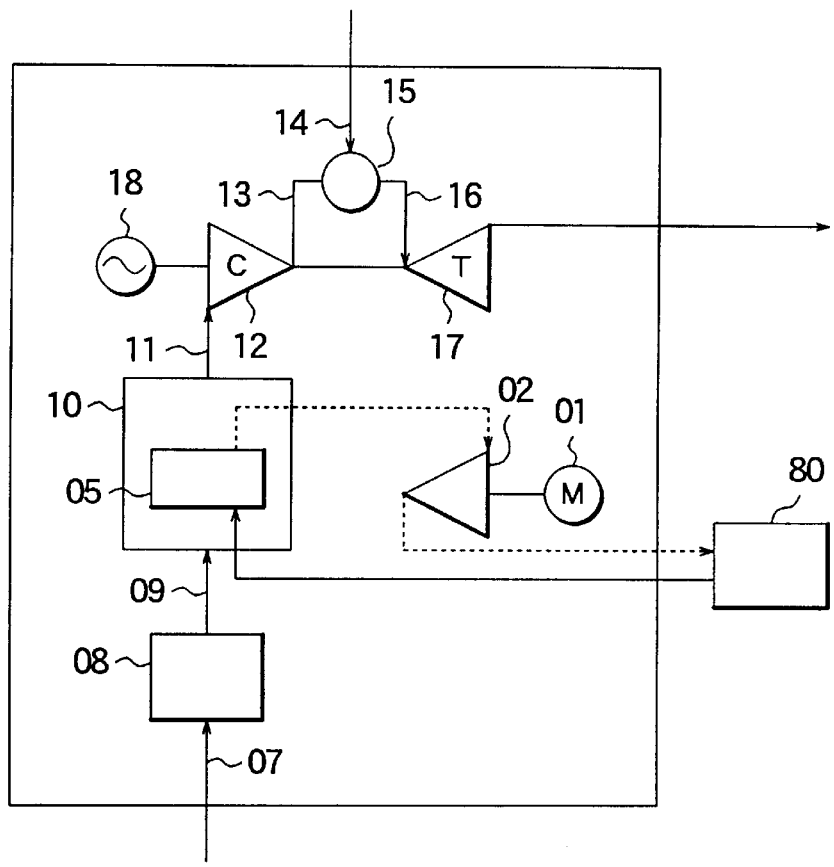
FIG. 1A is a block diagram showing a system configuration of an intake-air cooling type gas turbine power plant according to a first embodiment of the present invention.

The present invention will be described in detail in conjunction with what is presently considered as preferred or typical embodiments thereof by reference to the drawings. In the following description, like reference characters designate like or corresponding parts throughout the several views.

As mentioned previously, in the conventional intake-air cooling type gas turbine power equipment as well as in the conventional combined power plant employing the same, the heat (Q1) generated upon driving of the refrigerant compressor and the heat (Q2) deprived of the intake air of the gas turbine intake air upon cooling thereof with water circulating through the suction-air cooling chamber and the evaporator are dissipated from the cooling tower and/or other additional cooling apparatus by way of heat transfer medium (water) discharged from the condenser of the refrigeration system employed for cooling the intake air of the gas turbine. By contrast, in the intake-air cooling type gas turbine power equipment and the combined power plant employing the same according to the present invention, the heat (Q1; Q2) mentioned above is carried by the compressed refrigerant vapor discharged from the refrigerant compressor and supplied to an external heat utilization system or systems to be recovered for utilization therein. Thus, heat loss of the intake-air cooling type gas turbine power equipment or the combined power equipment as a whole can be suppressed effectively, which in turn means that the performance or operation efficiency of the intake-air cooling type gas turbine power equipment as well as that of the combined power equipment can be significantly enhanced when compared with the conventional equipment and plant.

Embodiment 1

FIG. 1A is a block diagram showing a system configuration of intake-air cooling type gas turbine power equipment according to a first embodiment of the present invention. In the intake-air cooling type gas turbine power equipment now under consideration, a refrigeration system is employed in which water/steam is employed as a refrigerant.

Referring to FIG. 1A, a refrigerant compressor 02 is driven by an electric motor 01 to compress a steam serving as a refrigerant. The pressurized steam discharged from the refrigerant compressor 02 at an increased pressure is supplied to a heat utilization system 80 in which heat carried by the pressurized steam is recovered to be utilized. As a result of this, the steam is condensed to water (condensed water), which is then circulated as a refrigerant liquid to an evaporator 05 disposed within an intake-air cooling chamber 10. In the evaporator 05 whose interior is maintained at a high vacuum level, the water undergoes expansion to be transformed to the steam. Upon transformation to the steam, water deprives heat equivalent or corresponding to the latent heat of vaporization to thereby refrigerate the ambient atmosphere. On the other hand, intake air 07 is supplied to the intake-air cooling chamber 10 as the feed air 09 after purification/noise reduction in a suction chamber 08. The air fed to the intake-air cooling chamber 10 is refrigerated under cooling action of the evaporator 05 disposed within the intake-air cooling chamber 10 to be delivered therefrom as cooled air 11. The cooled air 11 is subsequently supplied to an air compressor 12 to be compressed and discharged as compressed air 13 which is then fed to a combustor 15. In the combustor 15, the compressed air 13 undergoes combustion with fuel 14 charged from a relevant system (not shown), as a result of which a high-temperature combustion gas 16 is produced and fed to a gas turbine 17. Under the action of the high-temperature combustion gas, the gas turbine 17 is driven rotationally, whereby an electric generator 18 operatively coupled to a rotor shaft of the gas turbine is driven through rotation of the rotor shaft, whereby electric energy is generated.

In the intake-air cooling type gas turbine power equipment according to the first embodiment of the invention, the water/steam serving as the refrigerant for the refrigerating machine is caused to circulate through or between the heat utilization system 80 installed externally and the evaporator 05 of the refrigerating machine, wherein the pressurized steam discharged from the refrigerant compressor carries the heat generated upon compression of the refrigerant vapor produced by the refrigerant compressor as well as the heat transferred from the gas turbine intake air (air) upon cooling thereof is straightforwardly fed to the heat utilization system to be recovered for utilization as the heat carried by the pressurized steam after compression by the refrigerant compressor 02. Thus, with the arrangement of the intake-air cooling type gas turbine power equipment according to the instant embodiment of the invention, significantly high heat recovery efficiency can be achieved.

More specifically, in the intake-air cooling type gas turbine power equipment now under consideration, the evaporator 05 which constitutes a part of the refrigeration system is disposed within the intake-air cooling chamber 10 with a view to recovering directly the heat carried by the gas turbine intake air. By virtue of the arrangement in which the evaporator 05 of the refrigeration system is disposed directly within the intake-air cooling chamber 10 as mentioned above, not only the heat recovery efficiency for the gas turbine intake air can be increased but also the intake-air cooling type gas turbine power equipment can be designed and realized in a compact structure in which the refrigeration system and the intake-air cooling chamber are combined with each other as described above.

Figure 1B:
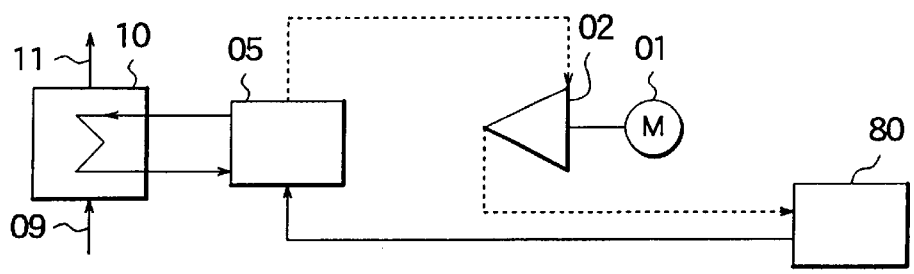
FIG. 1B is a block diagram showing a modification of the intake-air cooling type gas turbine power plant shown in FIG. 1A.

FIG. 1B is a block diagram showing a modification of the intake-air cooling type gas turbine power equipment shown in FIG. 1A. Referring to FIG. 1B, the evaporator 05 is disposed externally of the intake-air cooling chamber 10, wherein cold water serving as a heat transfer medium is caused to circulate through the evaporator 05 and the intake-air cooling chamber 10 for thereby recovering the heat carried by the gas turbine intake air in an indirect manner. In the case of the modified plant shown in FIG. 1B, the heat recovery efficiency may certainly be degraded more or less. However, because the refrigeration system can be used for cooling not only the gas turbine intake air but also other equipment or components which are disposed adjacently and require cooling, the cost involved in the installation as well as operation can be reduced. Of course, whether the evaporator 05 is to be installed internally or externally of the intake-air cooling chamber 10 can be selectively decided at the stage of plant design in consideration of advantages brought about by the installation of the evaporator internally or externally of the intake-air cooling chamber. The same holds true in succeeding embodiments.

Embodiment 2

Figure 2:
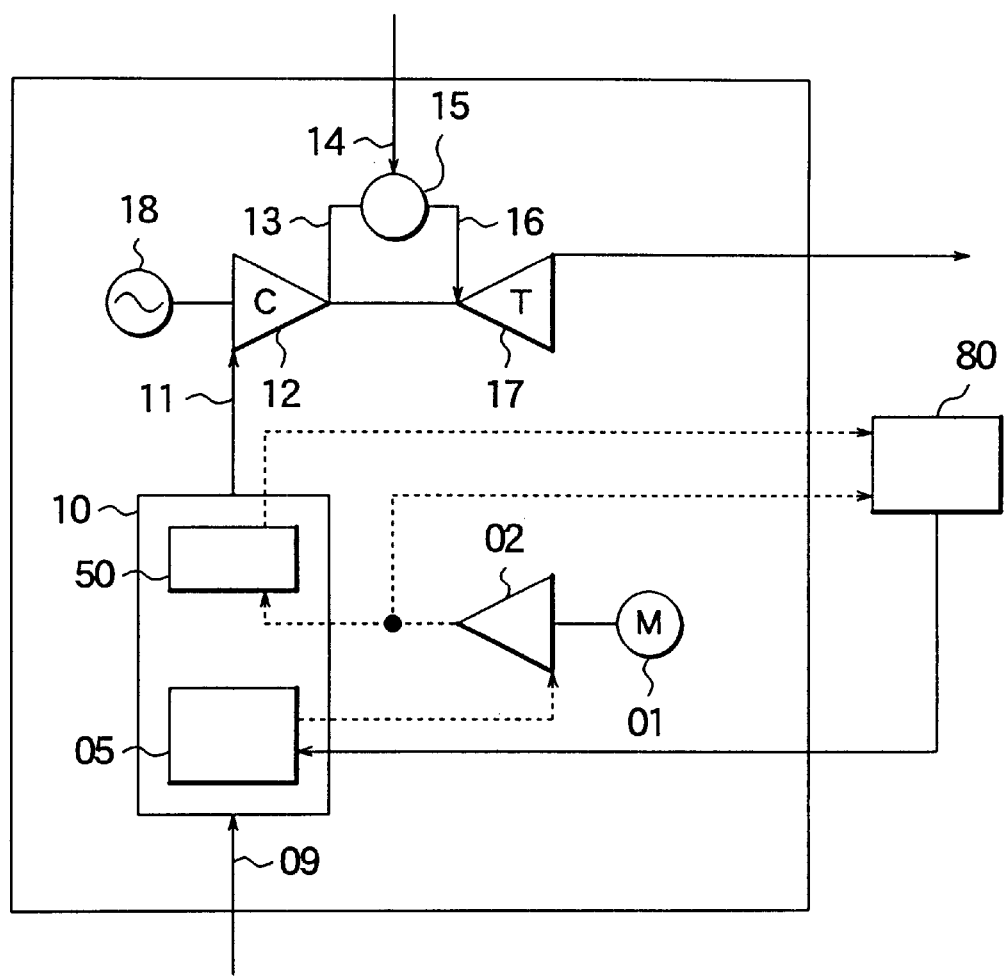
FIG. 2 is a block diagram showing a system configuration of intake-air cooling type gas turbine power equipment according to a second embodiment of the present invention.

FIG. 2 is a block diagram showing a system configuration of intake-air cooling type gas turbine power equipment according to a second embodiment of the present invention. Also in the intake-air cooling type gas turbine power equipment now of concern, a refrigeration system is adopted in which water/steam is employed as the refrigerant. Referring to FIG. 2, reference numeral 50 denotes a heater disposed within the intake-air cooling chamber 10 at a location near to the exit side of the cooled air discharged from the intake-air cooling chamber 10. In the intake-air cooling type gas turbine power equipment according to the instant embodiment of the invention, a part of the pressurized steam discharged from the refrigerant compressor 02 constituting a part of the refrigeration system is fed directly to the heat utilization system 80, whereas the other part of the pressurized steam is supplied indirectly to the heat utilization system 80 after flowing through the heater 50. Except for the arrangement mentioned just above, the intake-air cooling type gas turbine power equipment according to the second embodiment of the invention is identical with that shown in FIG. 1A.

Referring to FIG. 1B, the refrigerant compressor 02 is driven by the electric motor 01 to compress a steam serving as a refrigerant. A part of the pressurized steam discharged from the refrigerant compressor 02 at an increased pressure is supplied to the heat utilization system 80 in which heat carried by the pressurized steam is recovered to be utilized. The other or remaining part of the pressurized steam is utilized as heat source for the heater 50 and then supplied to the heat utilization system to be recovered for utilization. The feed air 09 is introduced into the intake-air cooling chamber 10 to be cooled under cooling action of the evaporator 05 disposed within the intake-air cooling chamber. Subsequently, the feed air 09 is heated and dried to some extent in the heater 50 and then supplied to the air compressor 12 as the cooled air 11. Operations of the other components are the same as those of corresponding ones in the intake-air cooling type gas turbine power equipment according to the first embodiment of the invention.

In the intake-air cooling type gas turbine power equipment according to the second embodiment of the invention, a part of the water/steam serving as the refrigerant is supplied to the heat utilization system installed externally of the power equipment to be recovered for utilization, while the remaining part of the water/steam is first made of as the heat source for the heater disposed within the intake-air cooling chamber and then supplied to the heat utilization system installed externally, circulating thus through the heat utilization system and the refrigeration system. By virtue of the arrangement mentioned just above, the pressurized steam discharged from the refrigerant compressor carries both the heat transferred from the gas turbine intake air (air) upon cooling thereof and the heat transferred upon compression of the refrigerant steam by the refrigerant compressor, wherein the heat carried by the pressurized steam is utilized as the heat source for the heater 50 disposed within the intake-air cooling chamber and at the same time recovered for utilization in the heat utilization system 80 installed externally of the intake-air cooling type gas turbine power equipment. Thus, enhanced heat recovery efficiency can be achieved.

Embodiment 3

Figure 3:
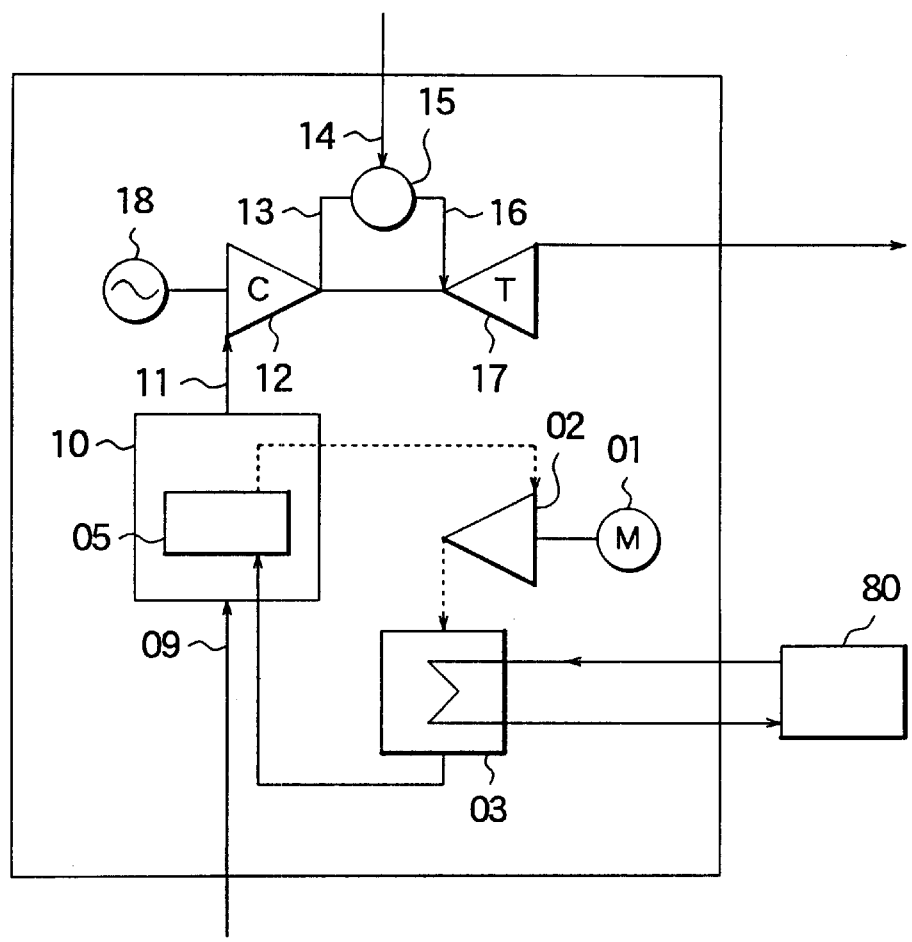
FIG. 3 is a block diagram showing a system configuration of intake-air cooling type gas turbine power equipment according to a third embodiment of the present invention.

FIG. 3 is a block diagram showing a system configuration of intake-air cooling type gas turbine power equipment according to a third embodiment of the present invention. A refrigeration system is adopted in which dedicated refrigerant such as substitute freon, ammonia or the like is employed as the refrigerant. In FIG. 3, reference numeral 03 denotes a condenser constituting a part of the refrigeration system. The refrigerant circulates through a closed loop constituted by the refrigerant compressor 02, the condenser 03 and the evaporator 05. A circuit for circulating a heat carrying medium (e.g. water) is provided between the condenser 03 and the heat utilization system 80. Except for the arrangement described just above, the intake-air cooling type gas turbine power equipment according to the third embodiment is essentially same as the equipment shown in FIG. 1A.

Referring to FIG. 3, the refrigerant is compressed by the refrigerant compressor 02 driven by the electric motor 01. The pressurized refrigerant vapor discharged from the refrigerant compressor 02 at an increased pressure is then supplied to the condenser 03. Within the condenser 03, the pressurized refrigerant vapor undergoes heat exchange with the heat transfer medium or heating medium (e.g. water) which is circulated through the condenser and the heat utilization system 80 installed externally, as a result of which the refrigerant vapor of high pressure is cooled to change or transform the phase to a liquid refrigerant phase. On the other hand, the heat transfer medium having the temperature increased by the heat carried by the refrigerant of high pressure through the heat exchange is supplied to the heat utilization system 80 where the heat carried by the heat transfer medium is recovered for utilization. The refrigerant having changed the phase to liquid in the condenser 03 undergoes expansion within the evaporator 05, which results in that the liquid refrigerant changes to the gas phase. In that case, the ambient atmosphere is deprived of heat equivalent to the latent heat of vaporization, whereby the ambient feed air 09 is cooled. The gas refrigerant discharged from the evaporator 05 is again compressed by the refrigerant compressor 02 to be transformed to pressurized refrigerant vapor. Through the processes mentioned above, a refrigeration system cycle is realized. In other words, in the refrigeration system according to the third embodiment of the invention, the refrigerant such as substitute freon or the like circulates through the refrigeration system cycle, wherein circulation with the external system is realized indirectly through the medium of the heat transfer medium (e.g. water) which circulates between the condenser 03 and the heat utilization system 80.

The feed air 09 is introduced into the intake-air cooling chamber 10 to be cooled under the cooling action of the evaporator 05 disposed within the intake-air cooling chamber 10. Subsequently, the feed air 09 is supplied to the air compressor 12 as the cooled air 11. Succeeding operations of the intake-air cooling type gas turbine power equipment according to the instant embodiment is essentially the same as the equipment according to the first embodiment of the invention.

As is apparent from the above description, in the intake-air cooling type gas turbine power equipment according to the third embodiment of the invention, the circulation of the refrigerant is confined only within the intake-air cooling type gas turbine power equipment, wherein circulation between the intake-air cooling type gas turbine power equipment and the external system is realized by circulating water serving as the heat transfer medium through the former and the latter. In other words, supply of the heat carried by the pressurized refrigerant vapor to the heat utilization system installed externally is realized through intervention of the heat transfer medium. Thus, when compared with the intake-air cooling type gas turbine power equipment according to the first embodiment of the invention, heat loss may occur to some extent upon heat exchange with the heat transfer medium. However, because both the heat generated upon compression of the refrigerant by the refrigerant compressor 02 and the heat received from the ambient upon cooling of the feed air 09 are carried by the compressed refrigerant vapor of high pressured discharged from the refrigerant compressor and supplied to the heat utilization system installed externally through the medium of water serving as the heat transfer medium, effective heat recovery and utilization can be achieved.

Embodiment 4

Figure 4:
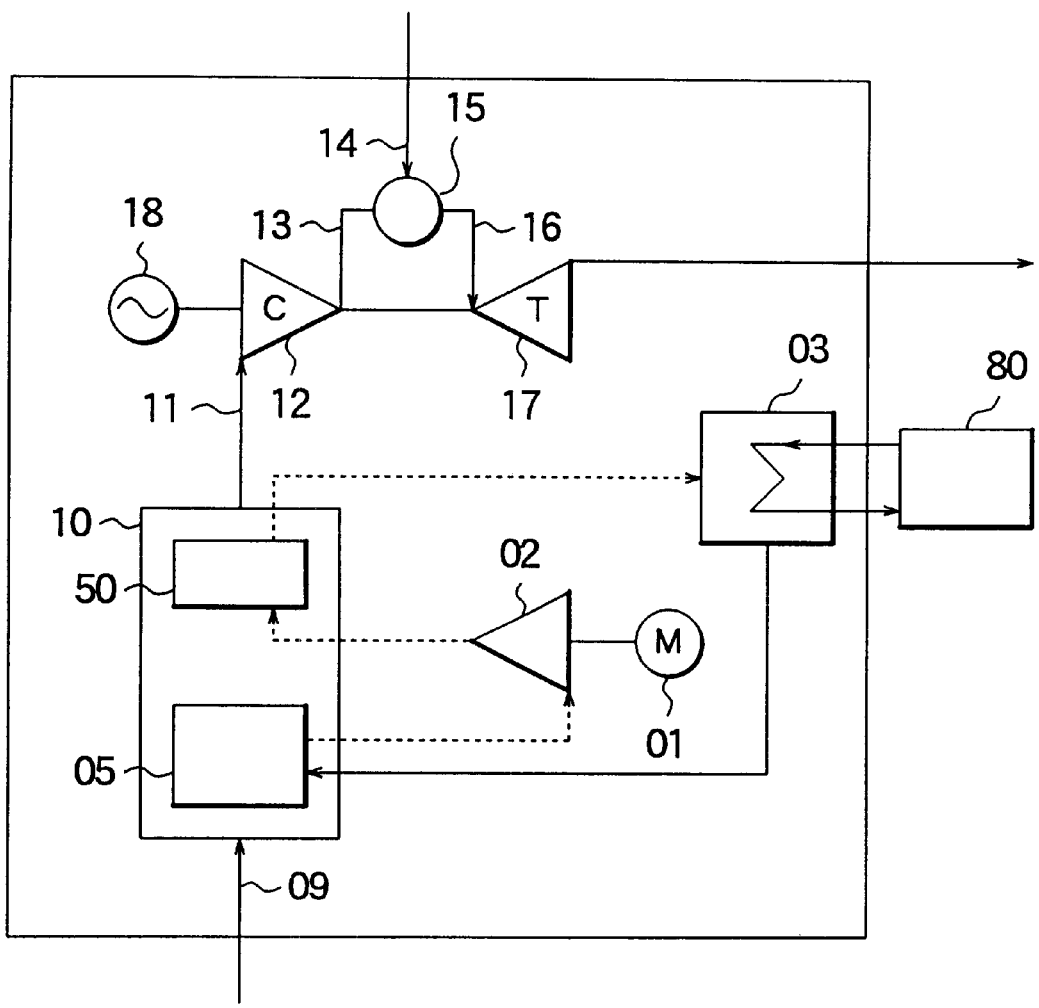
FIG. 4 is a block diagram showing a system configuration of intake-air cooling type gas turbine power equipment according to a fourth embodiment of the present invention.

FIG. 4 is a block diagram showing a system configuration of intake-air cooling type gas turbine power equipment according to a fourth embodiment of the present invention. In the refrigeration system as adopted, substitute freon, ammonia or the like is employed as the refrigerant. In FIG. 4, reference numeral 50 denotes a heater installed within the suction-air cooling chamber 10 at the cooled-air exit side thereof The intake-air cooling type gas turbine power equipment according to the fourth embodiment of the invention differs from that of the third embodiment in that the pressurized refrigerant vapor flowing from the refrigerant compressor 02 to the condenser 03 in the intake-air cooling type gas turbine power equipment of the third embodiment is caused to flow through the heater 50 installed within the intake-air cooling chamber on the way. Except for this difference, the intake-air cooling type gas turbine power equipment according to the instant embodiment of the invention is essentially the same as that of the third embodiment.

Referring to FIG. 4, the refrigerant is compressed by the refrigerant compressor 02 driven by the electric motor 01. The pressurized refrigerant vapor discharged from the refrigerant compressor 02 at an increased pressure is fed to the heater 50, wherein the pressurized refrigerant vapor is utilized as a heat source for heating the intake air before being supplied to the condenser 03. Within the condenser 03, the pressurized refrigerant vapor undergoes heat exchange with the heat transfer medium which is circulated between the condenser 03 and the heat utilization system 80 installed externally, as a result of which the pressurized refrigerant vapor is cooled to change the phase to a liquid refrigerant phase. On the other hand, the water or heat transfer medium having the temperature increased by the heat carried by the pressurized refrigerant vapor through the heat exchange is supplied to the heat utilization system 80 where the heat carried by the water or heat transfer medium is recovered for utilization. The refrigerant having changed into the liquid phase in the condenser 03 undergoes expansion within the evaporator 05, which results in that the liquid refrigerant changes to a gas phase. In that case, the ambient atmosphere is deprived of heat equivalent to the latent heat of vaporization, whereby the feed air 09 is cooled. The gas refrigerant discharged from the evaporator 05 is again compressed by the refrigerant compressor 02 to be transformed to pressurized refrigerant vapor. Through the processes mentioned above, a refrigeration system cycle is realized. In other words, in the refrigeration system of the equipment according to the instant embodiment of the invention, the refrigerant such as substitute freon or the like circulates through the refrigeration system cycle, wherein circulation between the intake-air cooling type gas turbine power equipment and the external system is realized indirectly through the medium of the heat transfer medium (e.g. water) which circulates through the condenser 03 and the heat utilization system 80.

The feed air 09 is introduced into the intake-air cooling chamber 10 to be cooled under the cooling action of the evaporator 05 disposed within the intake-air cooling chamber 10. Subsequently, the feed air 09 is heated and dried to some extent in the heater 50 and then supplied to the air compressor 12 as the cooled air 11. Operations of the other components are the same as corresponding ones in the intake-air cooling type gas turbine power equipment according to the other embodiments of the invention described hereinbefore.

As is apparent from the above description, in the intake-air cooling type gas turbine power equipment according to the fourth embodiment of the invention, circulation of the refrigerant is confined only within the intake-air cooling type gas turbine power equipment, wherein the circulation between the intake-air cooling type gas turbine power equipment and the external system is realized by circulating water serving as the heat transfer medium through the former and the latter. In other words, supply of the heat carried by the pressurized refrigerant vapor to the heat utilization system installed externally is realized through intervention of the heat transfer medium. Thus, when compared with the intake-air cooling type gas turbine power equipment according to the third embodiment of the invention, heat loss may occur to some extent upon heat exchange with the heat transfer medium. However, because the heat generated upon compression of the refrigerant by the refrigerant compressor 02 as well as the heat received from the intake air of the gas turbine upon cooling thereof are carried by the compressed refrigerant vapor of high pressured discharged from the refrigerant compressor and supplied to the heat utilization system installed externally, effective heat recovery and utilization can be achieved.

Embodiment 5

Figure 5:
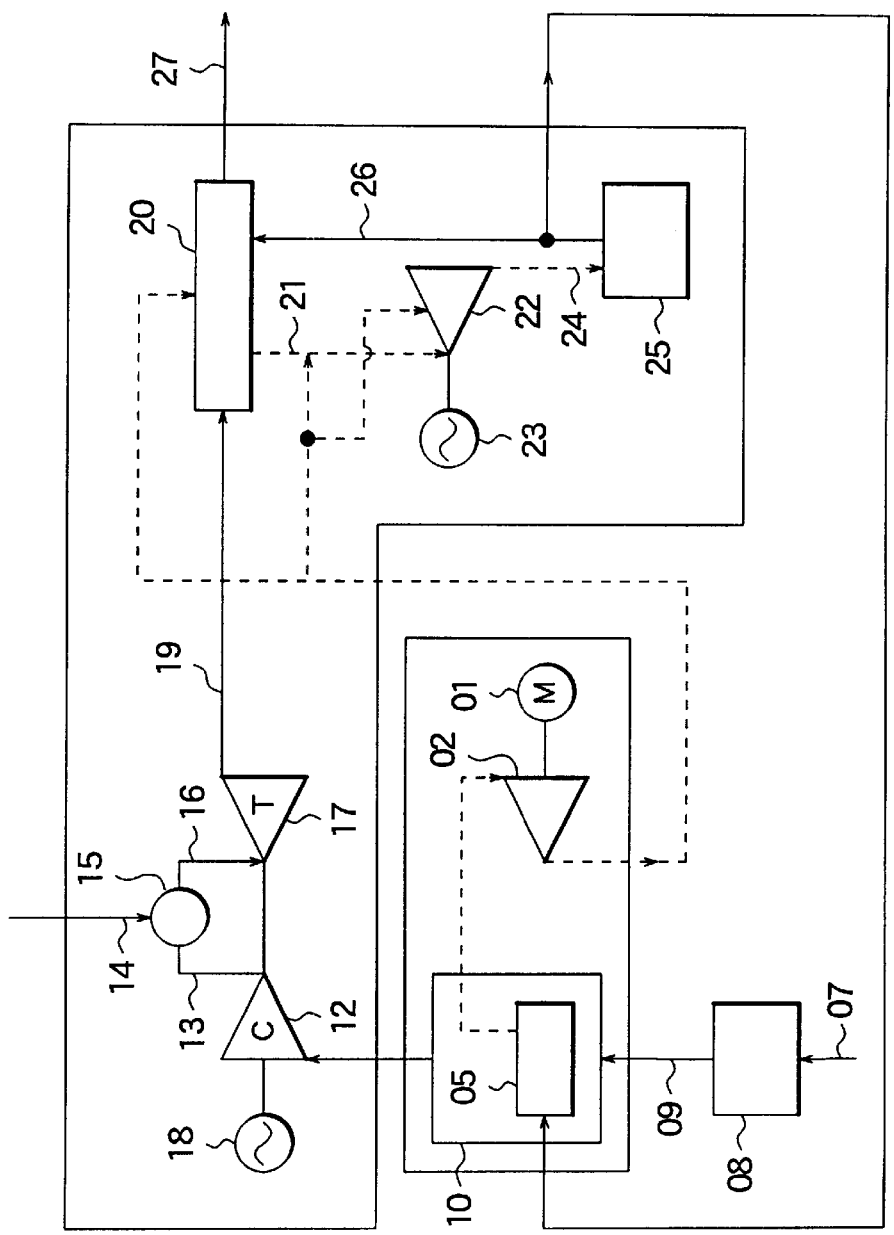
FIG. 5 is a block diagram showing a system configuration of a combined power plant according to a fifth embodiment of the present invention.

FIG. 5 is a block diagram showing a system configuration of a combined power plant according to a fifth embodiment of the present invention. The combined power plant is comprised of a heat-recovery type steam generation boiler and steam turbine power generation equipment which are operatively connected to or combined with intake-air cooling type gas turbine power equipment, in which a refrigeration system is adopted where water/steam is employed as the refrigerant. Referring to FIG. 5, reference numeral 20 denotes a heat-recovery type steam generation boiler to which an exhaust gas 19 of the gas turbine 17 is introduced to recover heat therefrom, 21 designates high-temperature/high-pressure steam extracted from the heat-recovery type steam generation boiler, 22 denotes a steam turbine driven rotationally under the action of the high-temperature/high-pressure steam, 23 denotes an electric generator operatively coupled to a shaft of the steam turbine 22, numeral 24 designates exhaust steam discharged from the steam turbine, 25 denotes a condenser for condensing the exhaust steam to water, 26 designates condensed water discharged from the condenser to be fed back to the heat-recovery type steam generation boiler 20, and numeral 27 designates exhaust gas discharged after having passed through the heat-recovery type steam generation boiler.

A part of the pressurized steam discharged from the refrigerant compressor 02 of the refrigeration system is branched or tapped on the way of flowing to the heat-recovery type steam generation boiler 20 to be charged into a steam pipe extending from the heat-recovery type steam generation boiler 20 at an intermediate portion thereof. Another part of the pressurized steam discharged from the refrigerant compressor 02 is fed to a pipe which leads to a low-pressure section of the steam turbine 22 to be used as the steam of lower pressure than the high-temperature/high-pressure steam 21 extracted from the heat-recovery type steam generation boiler. On the other hand, a part of the condensed water is fed back to the heat-recovery type steam generation boiler 20, while the other part thereof is fed back to the evaporator 05 of the refrigeration system.

With the arrangement described above, heat energy of the pressurized steam discharged from the refrigerant compressor 02 can be injected to the steam turbine 22 directly and/or by way of the heat-recovery type steam generation boiler 20 to be utilized as a part of energy for driving the electric generator 23 operatively coupled to the steam turbine. In this manner, effective utilization of heat can be achieved. The exhaust steam of the steam turbine 22 is condensed to water in the condenser 25, a part of the condensed water being fed back to the evaporator 05. The condensed water is utilized for cooling the intake air in the evaporator 05 and vaporized to steam which is then fed back to the refrigerant compressor 02. In this way, heat of the pressurized steam of the refrigeration system can be effectively utilized.

Embodiment 6

Figure 6:
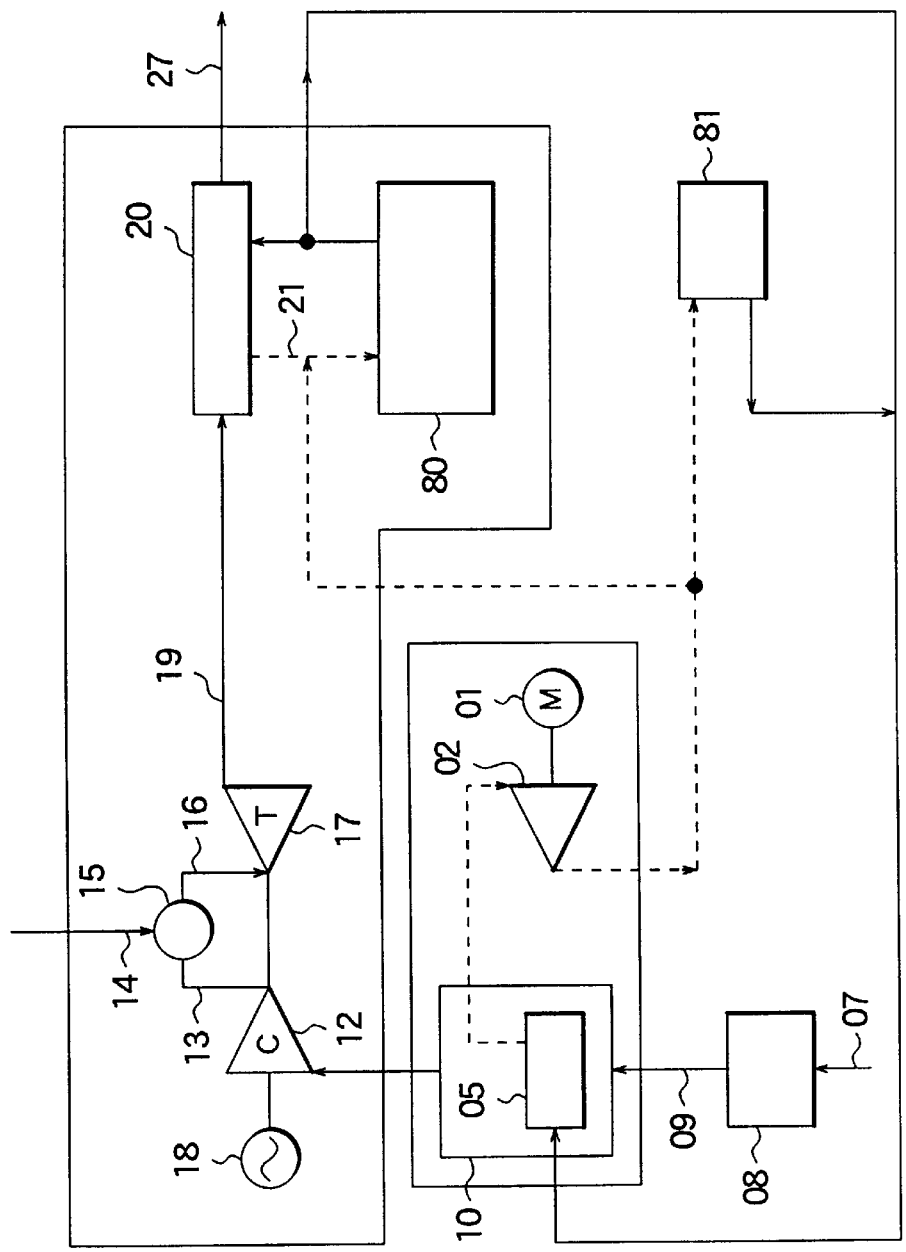
FIG. 6 is a block diagram showing a system configuration of a combined power plant according to a sixth embodiment of the present invention.

FIG. 6 is a block diagram showing a system configuration of a combined power plant according to a sixth embodiment of the present invention. The combined power plant is comprised of a heat-recovery type steam generation boiler and a heat utilization system which are operatively connected to or combined with the intake-air cooling type gas turbine power equipment, and additionally includes a thermal process other than the above-mentioned heat utilization system. A refrigeration system is adopted where water/steam is employed as the refrigerant. Referring to FIG. 6, reference numeral 20 denotes an heat-recovery type steam generation boiler to which an exhaust gas 19 of the gas turbine 17 is introduced to recover heat therefrom, 80 denotes a heat utilization system connected to the boiler mentioned just above, and numeral 21 designates high-temperature/high-pressure steam extracted from the heat-recovery type steam generation boiler to be supplied to the heat utilization system. Further, reference numeral 81 denotes a thermal process other than the heat utilization system 80.

In the combined power plant shown in FIG. 6, the high-temperature/high-pressure steam 21 and water resulting from the phase conversion of the high-temperature/high-pressure steam 21 deprived of heat in the heat utilization system 80 circulates between the heat-recovery type steam generation boiler 20 and the heat utilization system 80. The thermal process 81 is not connected to the heat-recovery type steam generation boiler 20. The pressurized steam discharged from the refrigerant compressor 02 is branched on the way of flowing, whereby a part of the pressurized steam is caused to merge into the flow of the high-temperature/high-pressure steam 21 to be supplied to the heat utilization system 80. Thus, heat carried by the high-temperature/high-pressure steam 21 is utilized in the heat utilization system 80. The other part of the high-temperature/high-pressure steam 21 is supplied to the other thermal process 81 for utilization of the heat carried by the steam. The steam supplied to the heat utilization system 80 is converted to water, a part of which is fed back to the evaporator 05 of the refrigeration system together with water resulting from condensation of the steam deprived of heat through the thermal process 81. In this way, effective utilization of heat of the pressurized steam discharged from the refrigerant compressor 02 of the refrigeration system can be accomplished.

Embodiment 7

Figure 7:
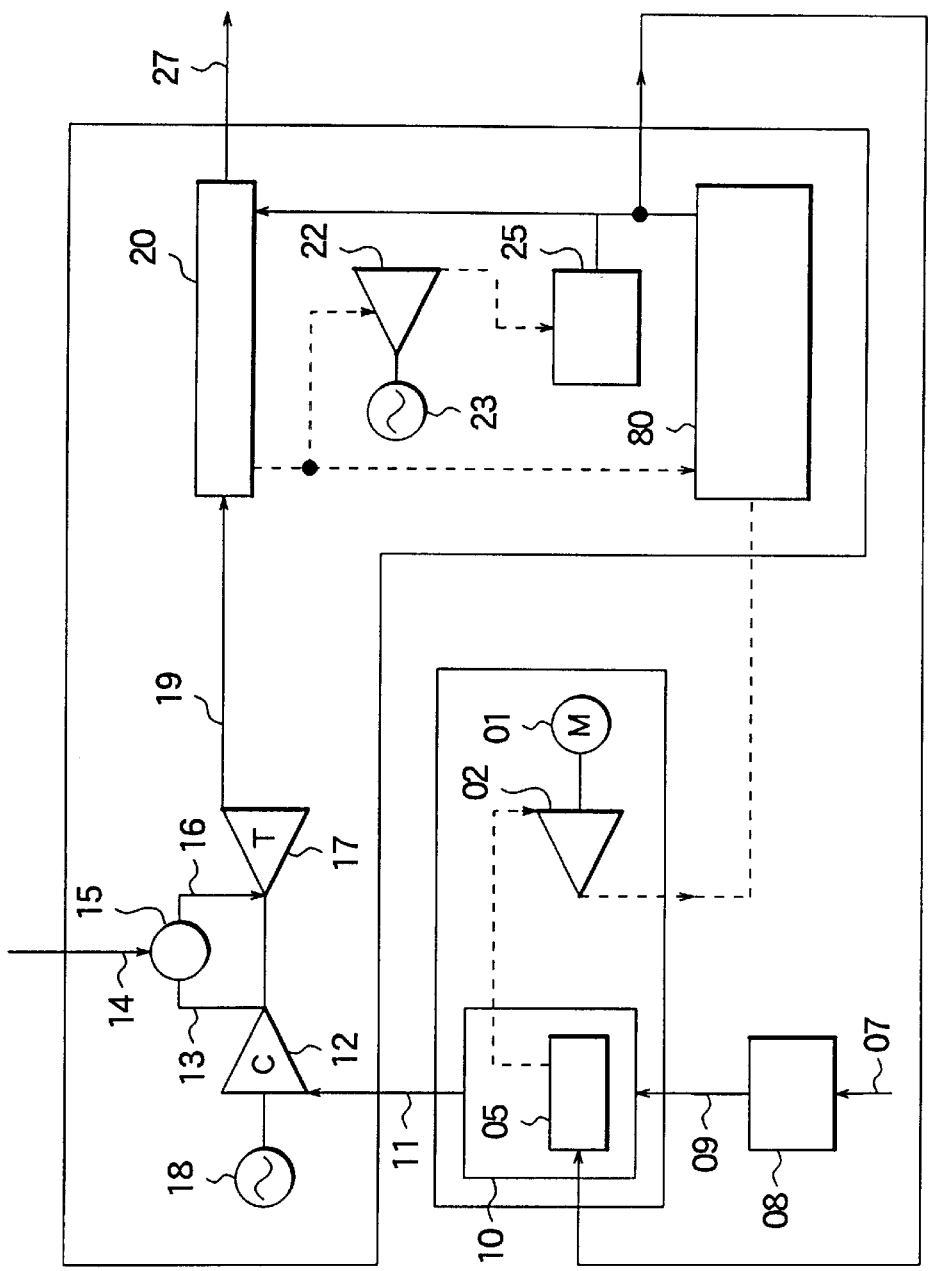
FIG. 7 is a block diagram showing a system configuration of a combined power plant according to a seventh embodiment of the present invention.

FIG. 7 is a block diagram showing a system configuration of a combined power plant according to a seventh embodiment of the present invention. The combined power plant is comprised of a heat-recovery type steam generation boiler, steam turbine power generation equipment and a heat utilization system which are operatively connected to the intake-air cooling type gas turbine power equipment. In this combined power plant, a refrigeration system is adopted where water/steam is employed as the refrigerant. Referring to FIG. 7, reference numeral 20 denotes a heat-recovery type steam generation boiler to which an exhaust gas 19 of the gas turbine 17 is introduced to recover heat therefrom, 22 denotes a steam turbine, 23 denotes an electric generator connected to the steam turbine, and 25 denotes a condenser. The steam turbine power generation equipment is constituted by the components mentioned just above. Incidentally the heat utilization system is denoted by reference numeral 80. The steam turbine power generation equipment and the heat utilization system 80 are connected in parallel relative to the heat-recovery type steam generation boiler 20. The pressurized steam discharged from the refrigerant compressor 02 of the refrigeration system is supplied to the destined heat utilization system 80 where heat carried by the pressurized steam is utilized effectively. Thus, in the destined heat utilization system 80, the pressurized steam is converted into water which is mixed with water discharged from the condenser 25. A part of water is fed back to the heat-recovery type steam generation boiler 20 with the other part of water being fed back to the evaporator 05 of the refrigeration system. In this way, there can be achieved effective utilization of heat of the pressurized steam discharged from the refrigerant compressor.

Embodiment 8

Figure 8:
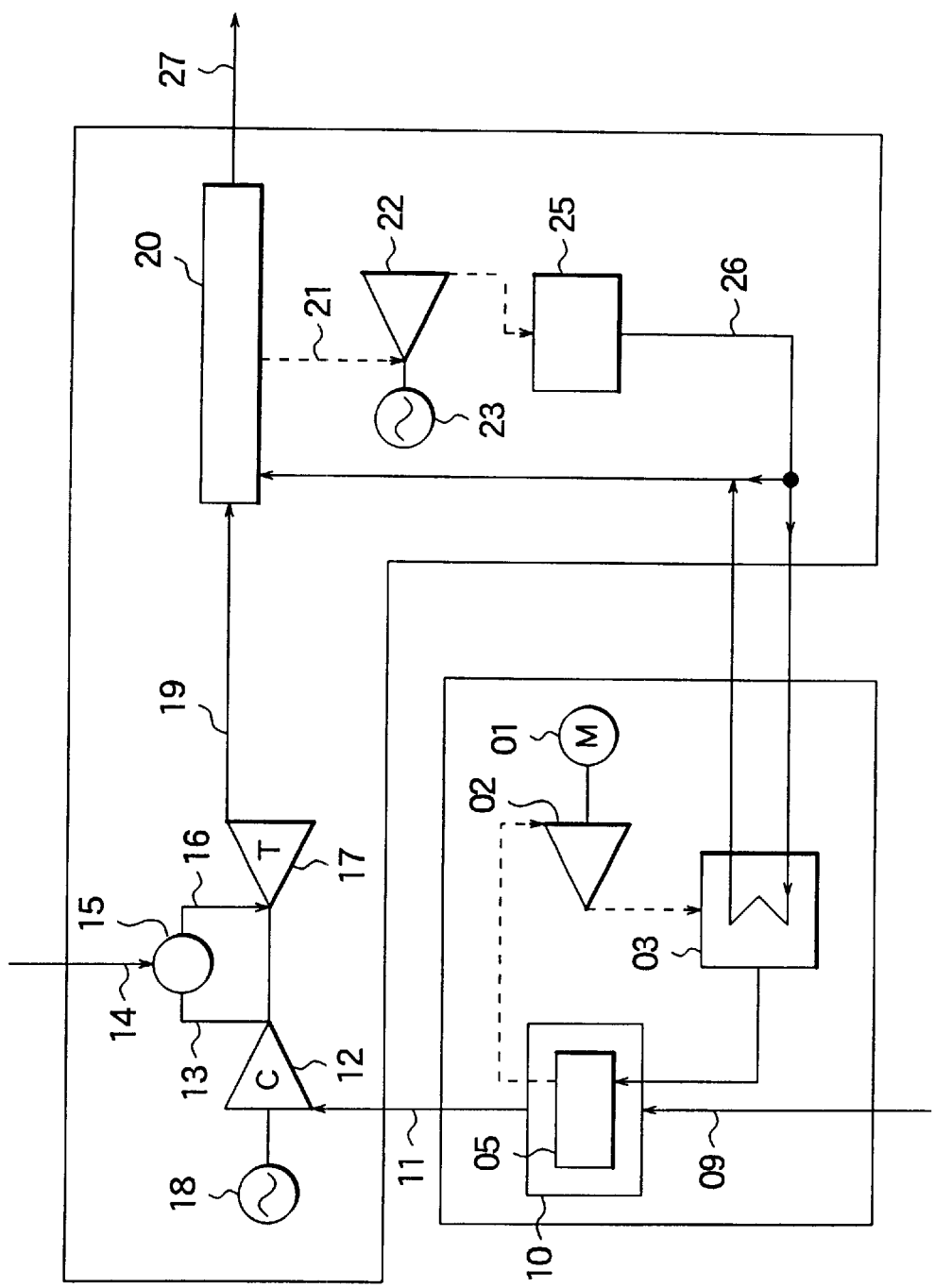
FIG. 8 is a block diagram showing a system configuration of a combined power plant according to an eighth embodiment of the present invention.

FIG. 8 is a block diagram showing a system configuration of a combined power plant according to an eighth embodiment of the present invention. In the combined power plant now under consideration, a heat-recovery type steam generation boiler and steam turbine power generation equipment connected to the boiler are operatively connected to intake-air cooling type gas turbine power equipment. In this plant, a refrigeration system is adopted in which dedicated refrigerant such as substitute freon or ammonia is employed as the refrigerant. Referring to the figure, the refrigeration system includes a condenser 03. Reference numeral 20 denotes the heat-recovery type steam generation boiler to which the exhaust gas 19 of the gas turbine 17 is introduced to recover heat therefrom. Reference numeral 21 designates high-temperature/high-pressure steam discharged from the high-temperature/high-pressure steam, 22 denotes a steam turbine, 23 denotes an electric generator, 25 denotes a condenser, and 26 denotes a condensed water.

With an arrangement of the combined power plant according to the instant embodiment of the invention, a part of the condensed water 26 fed back to the heat-recovery type steam generation boiler 20 from the condenser 25 of the steam turbine power generation equipment is circulated to the condenser 03 of the refrigeration system. Thus, heat available in the refrigeration system can be utilized for heating the condensed water. Thus, effective utilization of heat can be realized.

Embodiment 9

Figure 9:
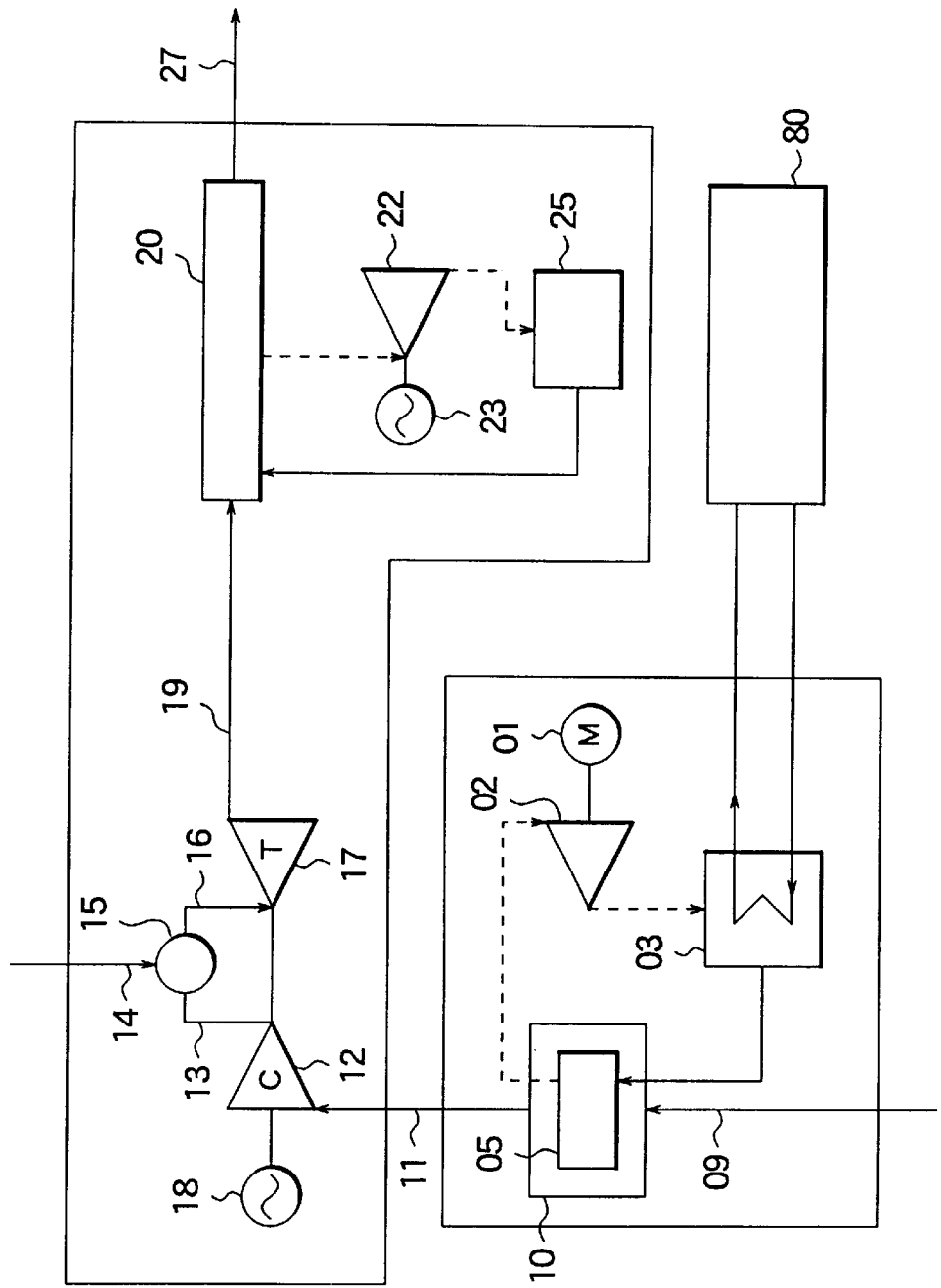
FIG. 9 is a block diagram showing a system configuration of a combined power plant according to a ninth embodiment of the present invention.

FIG. 9 is a block diagram showing a system configuration of a combined power plant according to a ninth embodiment of the present invention. In the combined power plant now of concern, the intake-air cooling type gas turbine power equipment is operatively combined with a heat-recovery type steam generation boiler and steam turbine power generation equipment which is connected to that boiler. Furthermore, a beat utilization system is provided independent of the heat-recovery type steam generation boiler and the steam turbine power generation equipment. A refrigeration system is adopted in which dedicated refrigerant such as substitute freon or ammonia is employed as the refrigerant. As can be seen in FIG. 9, a refrigeration system includes a condenser 03. The heat utilization system is denoted by reference numeral 80.

With the above arrangement of the combined power plant according to the ninth embodiment of the invention, a water circulation path is provided between the condenser 03 of the steam turbine power generation equipment and the heat utilization system 80 for realizing effective utilization of exhaust heat of the condenser 03 in the heat utilization system 80.

Embodiment 10

Figure 10:
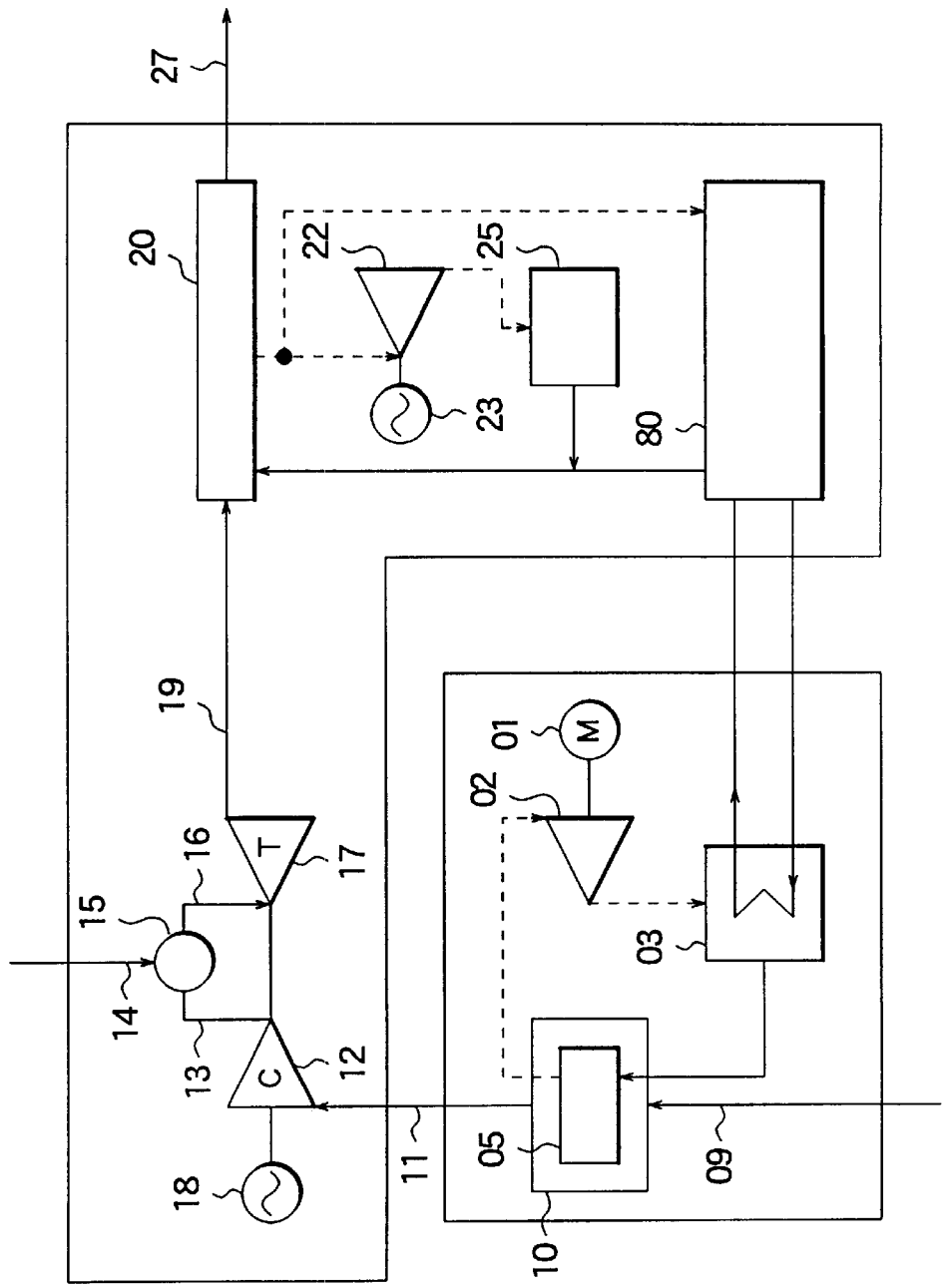
FIG. 10 is a block diagram showing a system configuration of a combined power plant according to a tenth embodiment of the present invention.

FIG. 10 is a block diagram showing a system configuration of a combined power plant according to a tenth embodiment of the present invention. The combined power plant is comprised of intake-air cooling type gas turbine power equipment, an heat-recovery type steam generation boiler, steam turbine power generation equipment and a heat utilization system, wherein the steam turbine power generation equipment and the heat utilization system are disposed in parallel to the boiler. A refrigeration system is adopted in which dedicated refrigerant such as substitute freon or ammonia is employed as the refrigerant. As can be seen in FIG. 10, a condenser 03 is provided in a refrigeration system. Reference numeral 80 denotes the heat utilization system.

With the above arrangement of the combined power plant according to the tenth embodiment of the invention, a water circulation path is provided between the condenser 03 of the refrigeration system and the heat utilization system 80 for realizing effective utilization of the exhaust heat of the condenser 03 in the heat utilization system 80.

Embodiment 11

Figure 11:
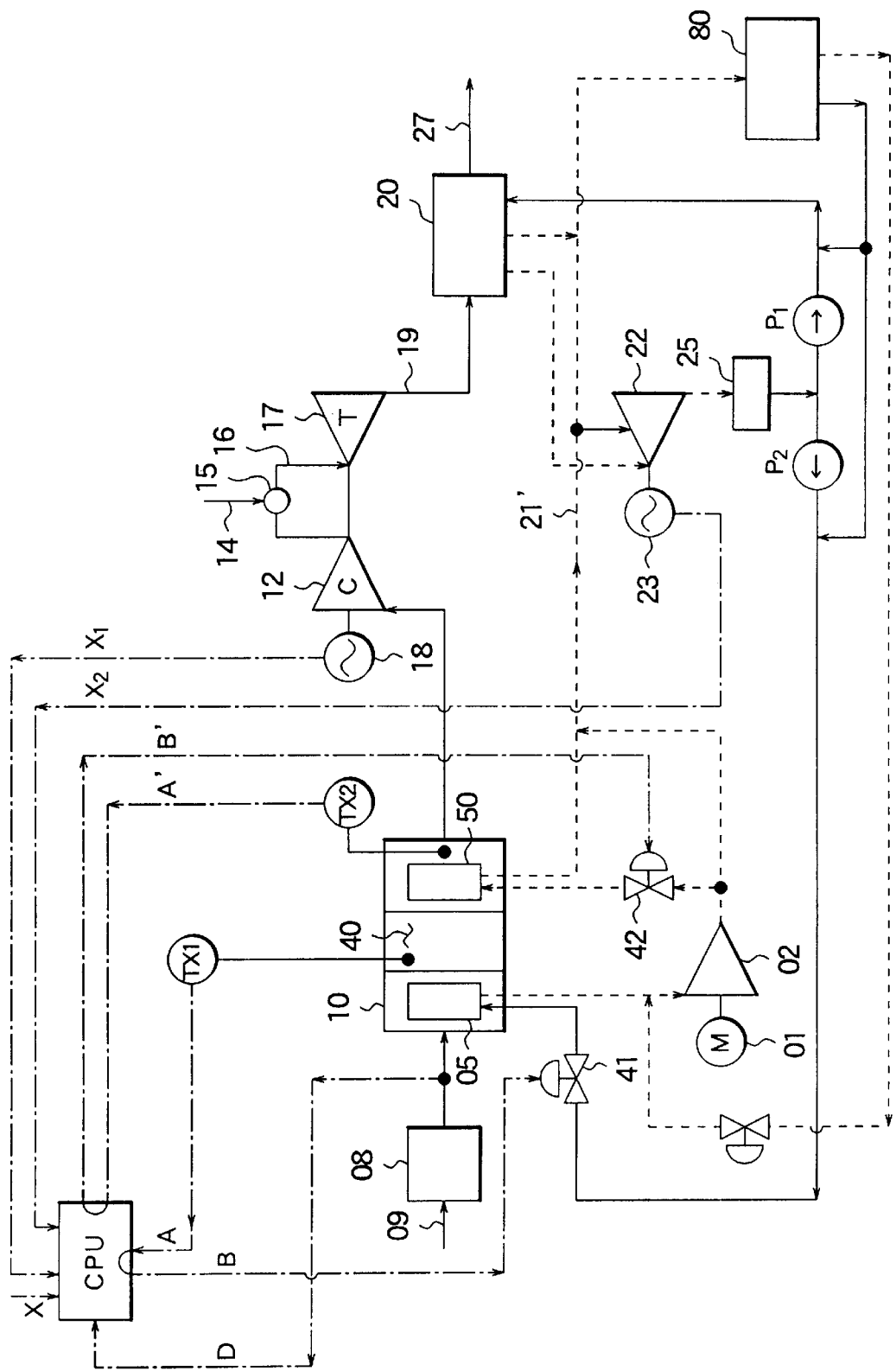
FIG. 11 is a block diagram showing a system configuration of a combined power plant according to an eleventh embodiment of the present invention.

FIG. 11 is a block diagram showing a system configuration of a combined power plant according to an eleventh embodiment of the present invention. The concept underlying the combined power plant now under consideration corresponds to combination of the concepts incarnated in the second and fifth embodiments of the invention described hereinbefore by reference to FIGS. 2 and 5. In the combined power plant according to the eleventh embodiment of the invention, a refrigeration system in which water/steam is employed as the refrigerant is adopted as the intake-air cooling system. Referring to FIG. 11, intake air and combustion gas resulting from combustion thereof flows along a path extending along a suction chamber 08, an intake-air cooling chamber 10, an air compressor 12, a combustor 15, a gas turbine 17 and an heat-recovery type steam generation boiler 20. An electric generator 18 is operatively coupled to a rotatable shaft common to both the air compressor 12 and the gas turbine 17. Disposed within the intake-air cooling chamber 10 is an evaporator 05, a dehumidifier 40 and a heater 50. The refrigeration system is composed of a refrigerant compressor 02, an electric motor 01 and an evaporator 05 which is disposed within the intake-air cooling chamber 10. Operatively coupled to the heat-recovery type steam generation boiler 20 is steam turbine power generation equipment which is comprised of a steam turbine 22, an electric generator 23 and a condenser 25. For driving the steam turbine power generation equipment, high-temperature/high-pressure steam 21 is supplied from the heat-recovery type steam generation boiler 20. In addition to the electric power generation system described above, a heat utilization system 80 is provided. In FIG. 11, broken lines represent steam flow paths, solid lines represent liquid flow paths, and single-dotted broken lines represent information/signal paths.

The steam discharged from the evaporator 05 disposed within the intake-air cooling chamber is compressed by the refrigerant compressor 02 driven by the electric motor 01 and discharged therefrom as pressurized steam. A part of this pressurized steam is caused to flow through the heater 50. Thereafter, the pressurized steam heated by the heater 50 merges into the pressurized steam discharged directly from the refrigerant compressor 02. The pressurized steam resultant from the merge is admixed to intermediate-pressure steam 21' extracted from an intermediate section of the heat-recovery type steam generation boiler 20 to be subsequently supplied to an intermediate section of the steam turbine 22 and the heat utilization system 80. The steam discharged from the steam turbine 22 is condensed to water by the condenser 25. A part of condensed water discharged from the condenser 25 is fed back to the evaporator 05 by means of a pump P1 while the other part is fed back to the heat-recovery type steam generation boiler 20 by means of a pump P2. A part of the steam supplied to the heat utilization system 80 is condensed and discharged in the liquid phase while the other part is discharged in the gas phase, i.e., in the form of steam. A part of the condensed water discharged from the heat utilization system 80 is led to the exit side of the pump P1 to thereby be fed back to the heat-recovery type steam generation boiler while the other part of water is led to the outlet side of the pump P2 to be fed back to the evaporator 05. On the other hand, the steam discharged from the heat utilization system is led to the inlet side of the refrigerant compressor 02. Paying attention to only the refrigerating cycle, the intrinsic role of the refrigerant compressor in the refrigerating cycle system is carried out by the condenser 25. Thus, the system configuration can be simplified. In the combined power plant according to the eleventh embodiment of the invention, it has been assumed that the dehumidifier 40 is incorporated. However, installation of such dehumidifier is not always required. In other words, decision as to whether the dehumidifier is to be installed or not may be left to discretion of the plant designer.

Furthermore, a valve 41 is installed in a pipe for supplying water to the evaporator 05 mounted within the intake-air cooling chamber 10, while a valve 42 is installed in a feed pipe for feeding the pressurized steam to the heater 50. For controlling the opening degrees of these valves, a controller CPU is provided. In FIG. 11, reference symbol X represents a desired power output value inputted to the controller CPU, X1 represents an actual power output of the gas turbine system, X2 represents an actual power output of the steam turbine system, D represents outlet temperature information of the suction chamber 08, TX1 represents output of a temperature sensor incorporated in the dehumidifier, A represents temperature information supplied to the controller CPU from the temperature sensor of the dehumidifier, B represents a control signal supplied to the valve 41 from the controller CPU, TX2 represents an output signal of a temperature sensor provided in association with the heater, A' represents temperature information sent to the controller CPU from the temperature sensor of the heater, and B' represents a control signal supplied to the valve 42 from the controller CPU.

When difference is found between the desired power output value X of the gas turbine system and the actual power output X1 of the gas turbine system, the desired values to be detected by the temperature sensors TX1 and TX2, respectively, are arithmetically determined by the controller CPU, whereon the controller CPU outputs the valve control signals B and B' for canceling out the difference between the temperature determined arithmetically and the actual temperature.

By contrast, when the desired power output value X indicates the combined power output of the gas turbine system and the steam turbine system, the power output X2 of the steam turbine system is affected by the factors such as the power output X1 of the gas turbine system, the temperature information A' outputted from a temperature sensor TX2 and the like. Accordingly, characteristic relations among the power output X2 of the steam turbine system, the power output X1 of the gas turbine system and the temperature information A' outputted from the temperature sensor TX2 installed at the outlet of the heater may be previously stored in the controller CPU for allowing the controller CPU to issue proper or appropriate valve control command signals B and B' for thereby regulate the outlet temperatures of the individual heaters. In this manner, the intake-air cooling type gas turbine power equipment can be regulated by controlling the power output of the gas turbine system.

Embodiment 12

Figure 12:
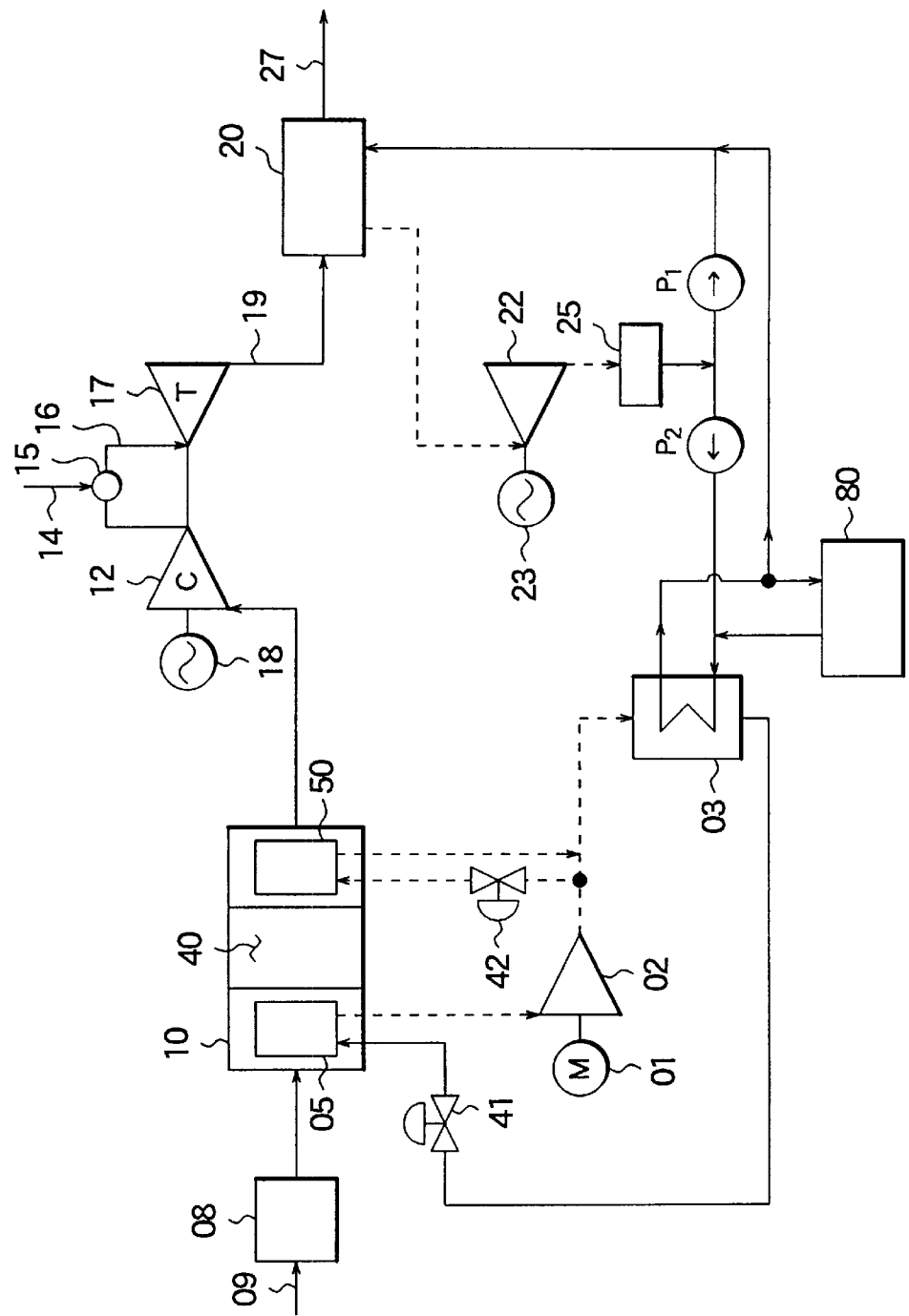
FIG. 12 is a block diagram showing a system configuration of a combined power plant according to a twelfth embodiment of the present invention.

FIG. 12 is a block diagram showing a system configuration of a combined power plant according to a twelfth embodiment of the present invention. The concept underlying the combined power plant now under consideration corresponds to a combination of the concepts incarnated, respectively, in the fourth and tenth embodiments described hereinbefore by reference to FIGS. 4 and 10. In the combined power plant according to the twelfth embodiment of the invention, a refrigeration system in which substitute freon or ammonia is employed as the dedicated refrigerant is adopted as the intake-air cooling system. Referring to FIG. 12, the flow path of the intake air and the combustion gas thereof extends along a suction chamber 08, an intake-air cooling chamber 10, an air compressor 12, a combustor 15, a gas turbine 17 and an heat-recovery type steam generation boiler 20. An electric generator 18 is operatively coupled to a rotatable shaft common to both the air compressor 12 and the gas turbine 17. Disposed within the intake-air cooling chamber 10 are an evaporator 05, a dehumidifier 40 and a heater 50. These components are the same as those in the plant according to the eleventh embodiment of the invention. Connected operatively to the evaporator 05 disposed within the intake-air cooling chamber 10 is a closed-loop refrigeration system which is constituted by a refrigerant compressor 02, an electric motor 01 and a condenser 03. Besides, operatively coupled to the heat-recovery type steam generation boiler 20 is steam turbine power generation equipment which is comprised of a steam turbine 22, an electric generator 23 and a condenser 25. In addition to the electric power generation system described above, a destined heat utilization system 80 is provided. In FIG. 12, broken lines represent steam flow paths, while solid lines represent fluid flow paths.

The steam discharged from the steam turbine 22 is condensed to water in the condenser 25, a part of which is fed back to the heat-recovery type steam generation boiler 20 by means of the pump P1 while the other part is fed to the condenser 03 by the pump P2 to undergo heat exchange with the refrigerant dedicated for the condenser 03. A part of water whose temperature is increased by the condenser 03 is fed back to the heat-recovery type steam generation boiler with the other part being supplied to the destined heat utilization system 80. Water having the temperature lowered in the heat utilization system is fed to the condenser 03 to be heated again.

At this juncture, it should be mentioned that the valves 41 and 42 are controlled by the means similar to those described previously in conjunction with the eleventh embodiment although the controller CPU and information signal lines are not illustrated in FIG. 12. Further, even though the combined power plant according to the twelfth embodiment of the invention is shown as incorporating the dehumidifier 40, it is not always necessary to install the dehumidifier. Whether the dehumidifier is to be installed or not may be left to discretion of the plant designer.

Embodiment 13

Figure 13:
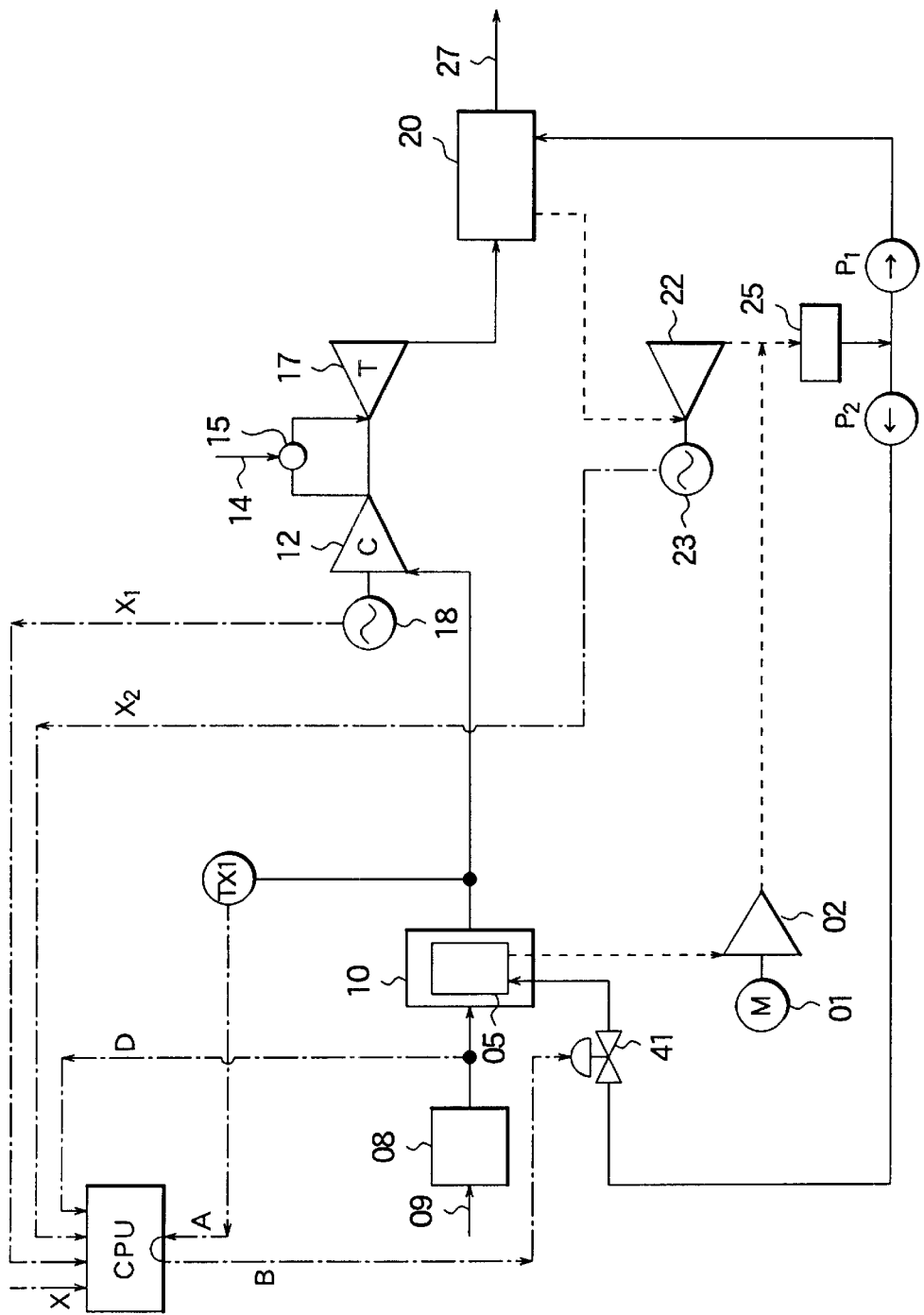
FIG. 13 is a block diagram showing a system configuration of a combined power plant according to a thirteenth embodiment of the present invention.

FIG. 13 is a block diagram showing a system configuration of a combined power plant according to a thirteenth embodiment of the present invention. The combined power plant now under consideration is so designed that the steam discharged from the refrigerant compressor 02 in the combined power plant shown in FIG. 5 is condensed at the condenser 25 together with the steam discharged from the steam turbine 22. In the combined power plant according to the instant embodiment of the invention, a refrigeration system in which water/steam is employed as the refrigerant is adopted as the intake-air cooling system. Referring to FIG. 13, the flow path for the intake air and the combustion gas extends along a suction chamber 08, an intake-air cooling chamber 10, an air compressor 12, a combustor 15, a gas turbine 17 and a heat-recovery type steam generation boiler 20. An electric generator 18 is operatively coupled to a rotatable shaft common to both the air compressor 12 and the gas turbine 17. Within the intake-air cooling chamber 10, only the evaporator 05 is disposed. Neither the dehumidifier nor a heater is provided therein. The refrigerant compressor 02 and an electric motor 01 are operatively coupled to the evaporator 05. On the other hand, operatively coupled to the heat-recovery type steam generation boiler 20 is power generation equipment which is comprised of a steam turbine 22, an electric generator 23 and a condenser 25. In FIG. 13, broken lines represent steam flow paths, solid lines represent liquid flow paths, and single-dotted broken lines represent information/signal paths, respectively.

The pressurized steam discharged from the refrigerant compressor 02 is caused to merge into the steam discharged from the steam turbine 22 to be subsequently sent to the condenser 25. A part of water discharged from the condenser is fed back to the heat-recovery type steam generation boiler 20 by means of the pump P1 while the other part is fed to the evaporator 05 of the intake-air cooling system by means of the pump P2. A valve 41 is installed in a pipe for feeding the water to the evaporator 05. This valve 41 is controlled in accordance with a valve manipulation signal B which is arithmetically determined on the basis of the desired output value X of the combined power plant comprised of the gas turbine system and the steam turbine system, the gas turbine power output X1, the steam turbine power output X2, the outlet temperature D of the suction chamber and the outlet temperature A of the intake-air cooling chamber so that the output power which conforms to the desired output value can be generated.

Embodiment 14

Figure 14:
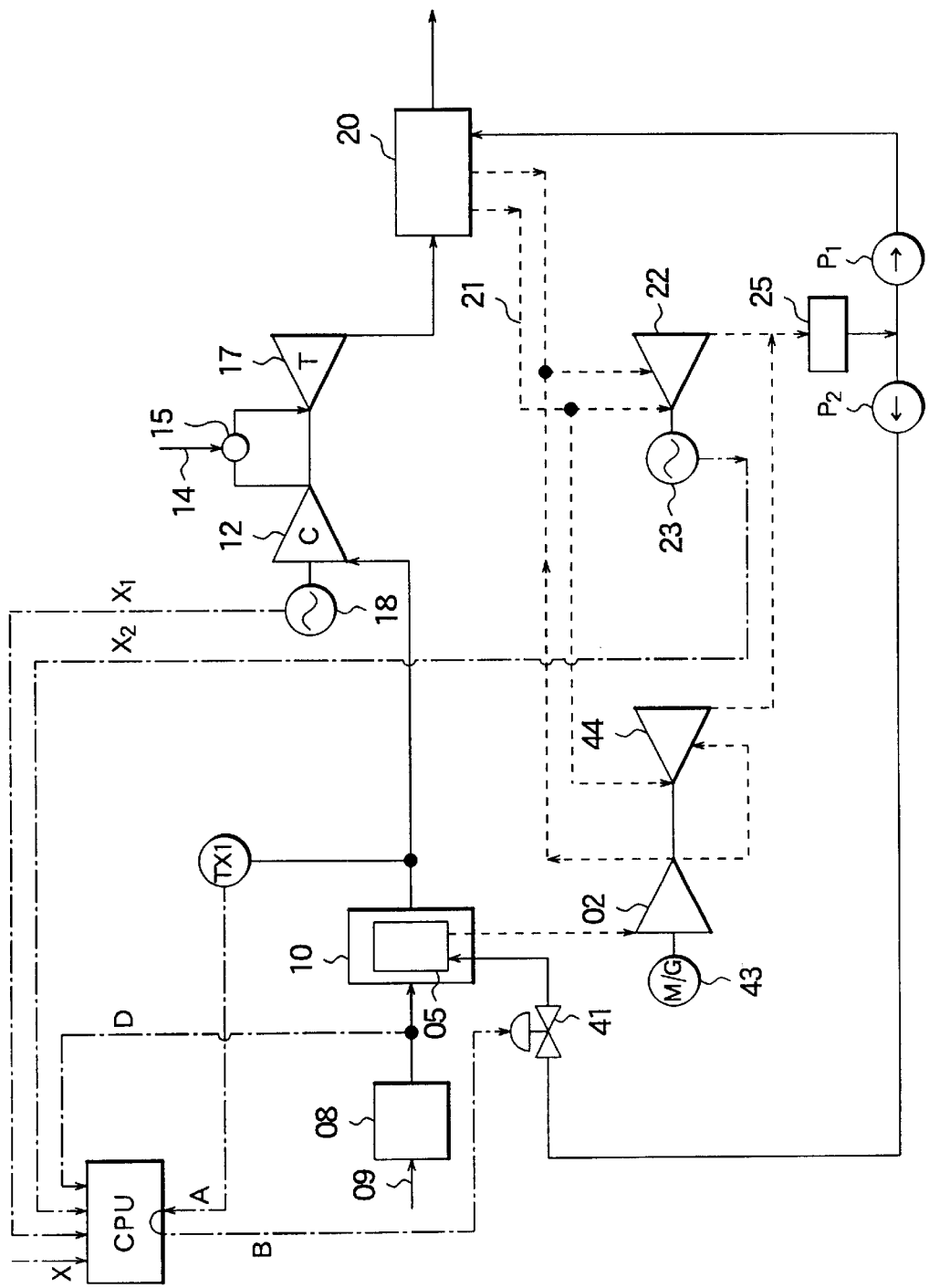
FIG. 14 is a block diagram showing a system configuration of a combined power plant according to a fourteenth embodiment of the present invention.
Figure 15:
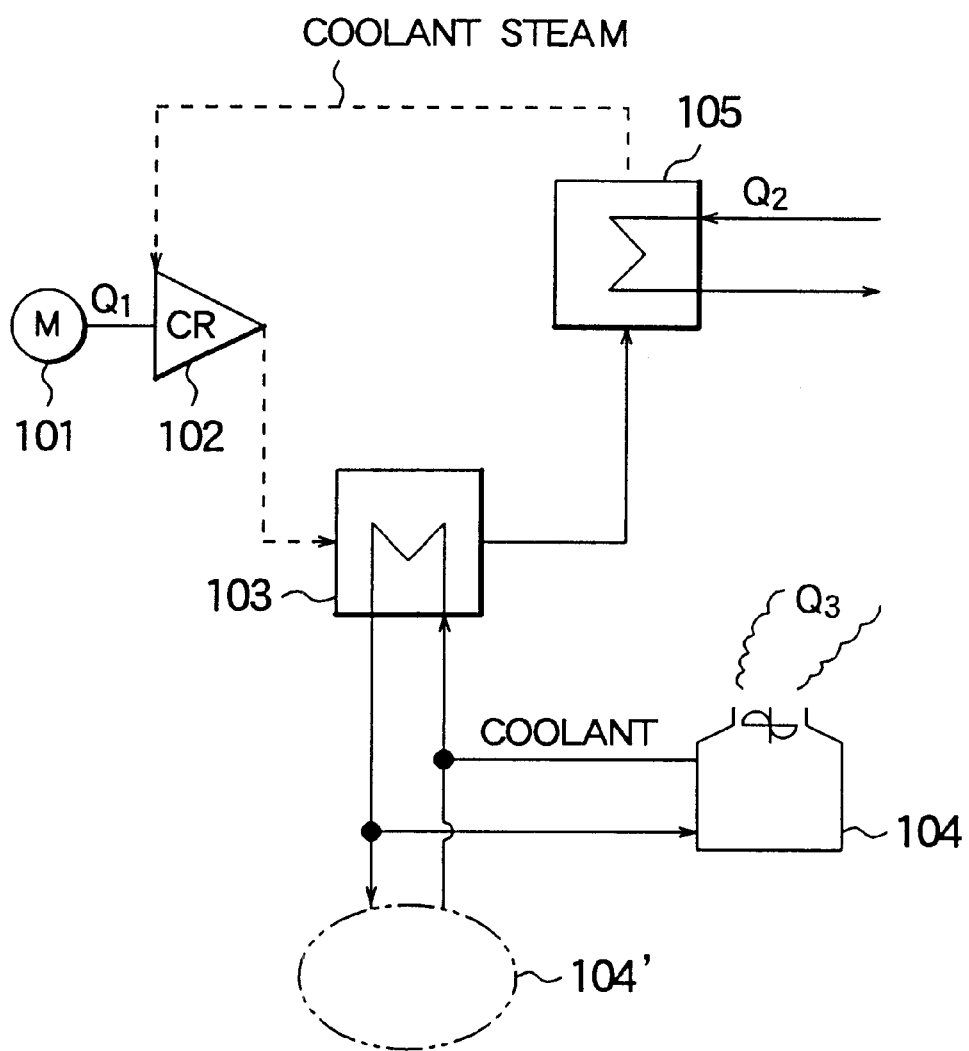
FIG. 15 is a block diagram showing a system configuration of an intake-air cooling refrigeration system employed in a conventional gas turbine power plant.
Figure 16:
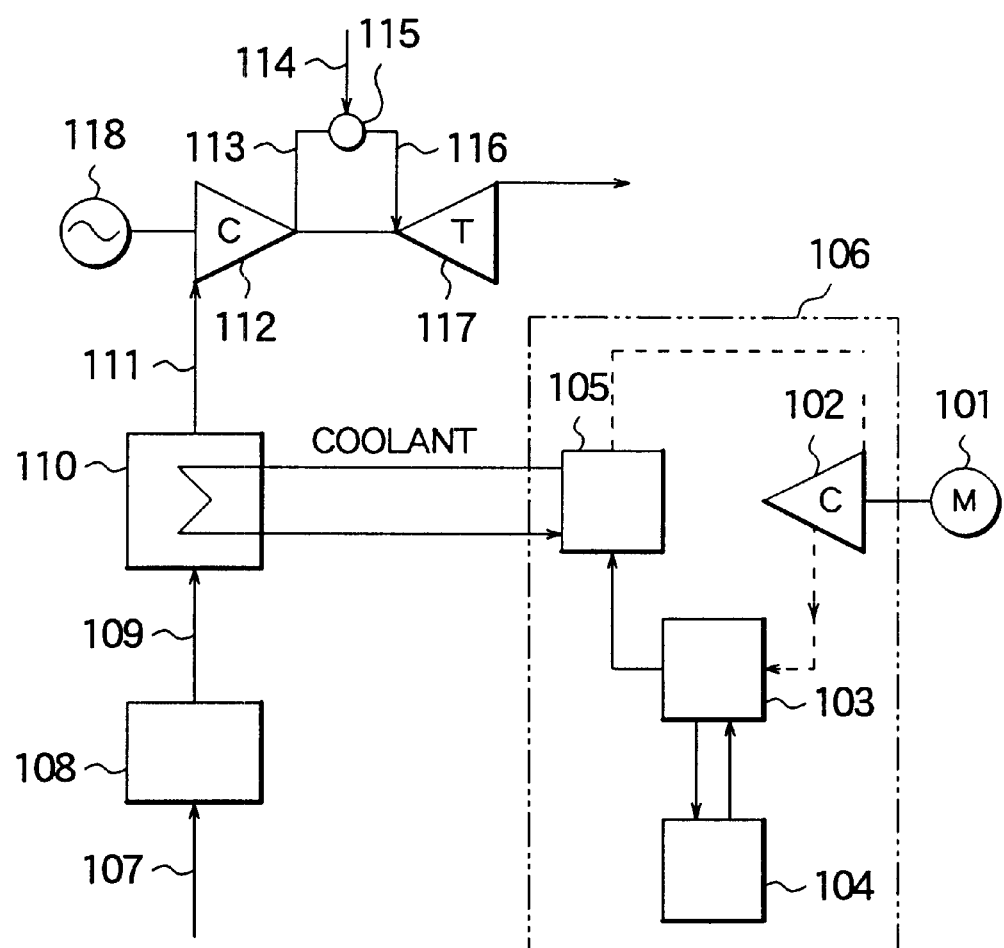
FIG. 16 is a block diagram showing a system configuration of a conventional intake-air cooling type gas turbine power equipment.
Figure 17:
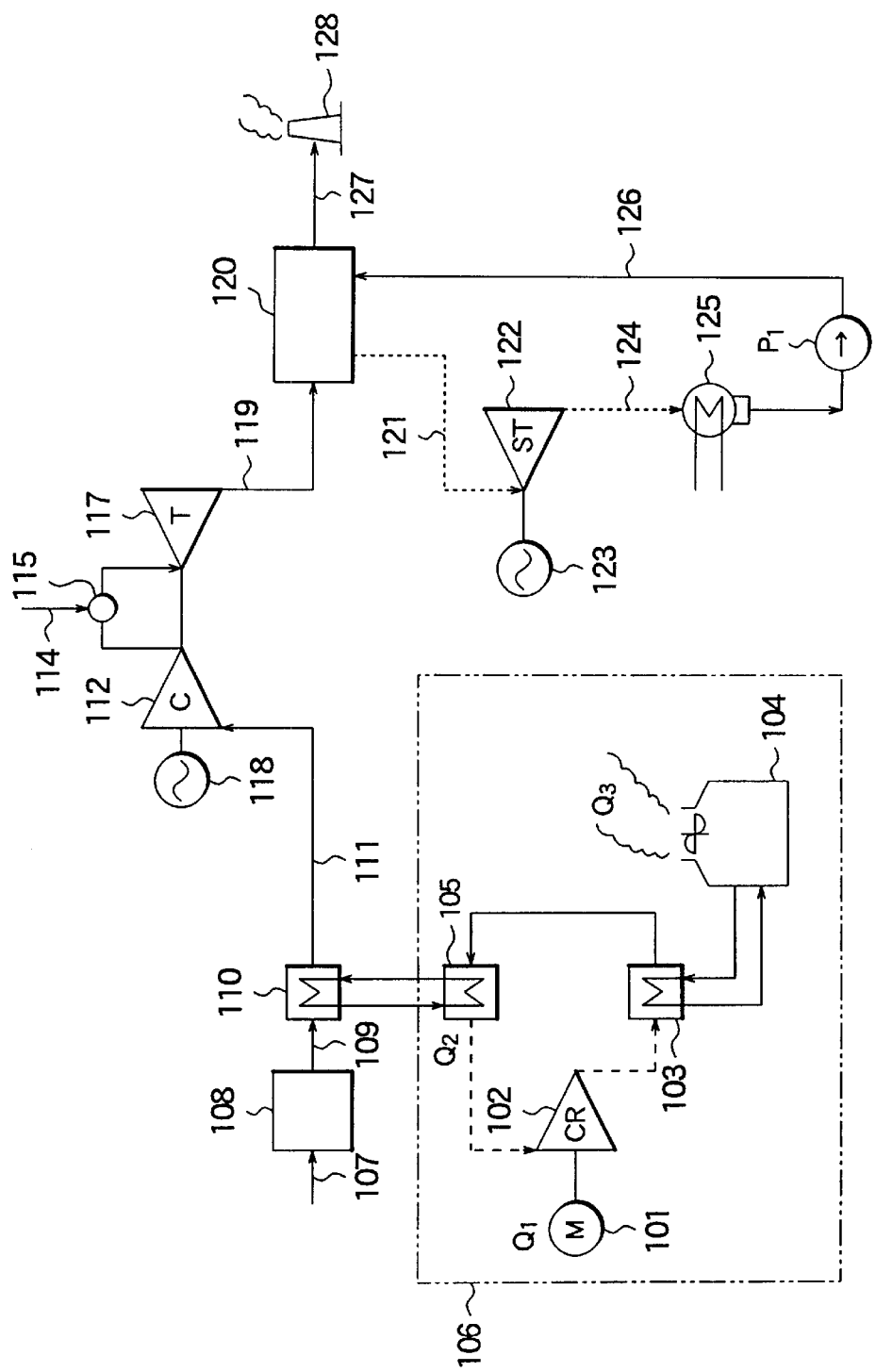
FIG. 17 is a block diagram showing a system configuration of a conventional combined power plant.

FIG. 14 is a block diagram showing a system configuration of a combined power plant according to a fourteenth embodiment of the present invention. In the combined power plant according to the instant embodiment, a refrigeration system in which water/steam is employed as the refrigerant is adopted as the intake-air cooling system. Referring to FIG. 14, a flow path of the intake air and the combustion gas resulting from combustion thereof extend along a suction chamber 08, an intake-air cooling chamber 10, an air compressor 12, a combustor 15, a gas turbine 17 and an heat-recovery type steam generation boiler 20. An electric generator 18 is operatively coupled to a rotatable shaft common to both the air compressor 12 and the gas turbine 17. Disposed within the intake-air cooling chamber 10 is only an evaporator 05. Connected operatively to the evaporator 05 are the steam turbine power generation equipment which is comprised of a refrigerant compressor 02, a generator motor 43 and a steam turbine 44. On the other hand, operatively coupled to the heat-recovery type steam generation boiler 20 is steam turbine power generation equipment comprised of a steam turbine 22, an electric generator 23 and a condenser 25. In FIG. 14, broken lines represent steam flow paths, solid lines represent liquid flow paths, and single-dotted broken lines represent information/signal paths.

A part of the high-temperature/high-pressure steam 21 discharged from the termination end of the steam path in the heat-recovery type steam generation boiler 20 is supplied to the steam turbine 22 with the other part of the high-temperature/high-pressure steam 21 being supplied to the steam turbine 44. The steam discharged from the evaporator 05 installed within the intake-air cooling chamber is compressed by the refrigerant compressor 02. A part of the pressurized steam delivered from the refrigerant compressor 02 is mixed with the steam extracted from an intermediate portion of the steam flow path in the heat-recovery type steam generation boiler to be subsequently supplied to an intermediate section of the steam turbine 22. On the other hand, the other part of the steam is supplied to an intermediate section of the steam turbine 44. The generator motor 43 is operated as the electric generator or the electric motor in dependence on the output of the steam turbine 44 and the load imposed to the refrigerant compressor 02. In brief, the generator motor 43 is operated in the electric generating mode when electric energy can be taken out, while it is operated in the motor mode when the driving power is required. The steam discharged from the steam turbine 44 is caused to merge into the steam discharged from the steam turbine 22 to be subsequently sent to the condenser 25 where the steam is condensed to water. A part of the water is fed back to the heat-recovery type steam generation boiler 20 through the pump P1 with the other part being fed to the evaporator 05 of the intake-air cooling chamber through the pump P2. A valve 41 is installed in a pipe for feeding the water to the evaporator 05. This valve 41 is controlled in accordance with a valve manipulation signal B which is arithmetically determined on the basis of the desired output value X of the combined power plant comprised of the gas turbine system and the steam turbine system, the actual gas turbine power output X1, the actual steam turbine power output X2, the outlet temperature D of the suction chamber and the outlet temperature A of the intake-air cooling chamber so that the output power which conforms to the desired output value X can be generated.

At this juncture, it should be mentioned that in the foregoing elucidation of the intake-air cooling type gas turbine power equipment as well as the combined power plant including the intake-air cooling type gas turbine power equipment according to the various embodiments of the invention, no description has been made concerning the cooling tower and other cooling apparatuses used for feeding coolant water to the condenser and for cooling the coolant water having temperature raised by the condenser as described hereinbefore in conjunction with the conventional refrigeration system. It should however be noted that in the systems according to the present invention, such cooling tower or the like cooling apparatuses of the conventional system may be employed in combination in case the cooling capacity required for cooling the gas turbine intake air exceeds the quantity of heat which is recovered for utilization in the heat utilization system.

Finally, it should be pointed out that although the present invention can be carried in six types of modes corresponding to combinations of the embodiments shown in FIGS. 1 and 2 with those shown in FIGS. 5, 6 and 7 and six types of modes corresponding to the embodiments shown in FIGS. 8, 9 and 10, i.e., in twelve sorts of modes in total, the invention is never restricted to such modes.

Many modifications and variations of the present invention are possible by various combinations of components or the like in the light of the above techniques. It is therefore to be understood that within the scope of the appended claims, the invention may be practiced otherwise than as specifically described.

What is claimed is:

1. An intake-air cooling type gas turbine power equipment, comprising:
    a refrigeration system including an evaporator and a refrigerant compressor;

an intake-air cooling chamber for cooling air taken in from the atmosphere by said evaporator of said refrigeration system;

an intake air heating system that heats the cooled air to thereby obtain dry, low temperature air;

an air compressor for compressing the dry, low temperature air to thereby produce compressed air;

a combustor for burning a fuel supplied from an external system with the compressed air produced by said air compressor to thereby produce a combustion gas;

a gas turbine driven rotationally under the action of said combustion gas produced by said combustor; and an electric generator operatively coupled to a rotor shaft of said gas turbine for generating electric energy, being driven through rotation of said rotor shaft;

wherein the refrigerant vapor leaving said evaporator of said refrigeration system is compressed by said refrigerant compressor to be transformed to a pressurized refrigerant vapor, and wherein heat carried by said pressurized refrigerant vapor is supplied to the intake air heating system.

2. The intake-air cooling type gas turbine power equipment according to claim 1, wherein said pressurized refrigerant vapor that leaves said refrigerant compressor is circulated through said intake air heating system so that the heat carried by said pressurized refrigerant vapor is supplied to said intake air heating system for recovery.

3. The intake-air cooling type gas turbine power equipment according to claim 1, wherein said air intake heating system includes a heater for heating and drying the air cooled by said intake-air cooling chamber, wherein the heater is disposed within said intake-air cooling chamber at a cooled-air outlet side thereof, and wherein heat carried by said pressurized refrigerant vapor leaving said refrigerant compressor is utilized as a source of heat for said heater.

4. The intake-air cooling type gas turbine power equipment according to claim 1, wherein said intake air heating system includes a heater.

5. A method of operating gas turbine power equipment comprising the steps of:

providing gas turbine power equipment comprising an evaporator, a refrigerant compressor, an intake air cooling chamber, an intake air heating system, an air compressor, a combustor, a gas turbine and an electric generator;

cooling air taken in from the atmosphere by the evaporator in the intake air cooling chamber;

heating the cooled air to thereby obtain dry low temperature air;

compressing the dry low temperature air in the air compressor to thereby produce compressed air;

burning a fuel with the compressed air to thereby produce a combustion gas;

rotationally driving the gas turbine under the action of the combustion gas; and generating electric energy by the electric generator being driven through rotation of a rotor shaft of the gas turbine coupled to the electric generator;

wherein refrigerant vapor leaving said evaporator is compressed by said refrigerant compressor to be transformed to a pressurized refrigerant vapor, and wherein, in the intake heating system, heat carried by said pressurized refrigerant vapor the cooled air to obtain the dry, low temperature air.

* * * * *